Sept. 14, 1943. L. M. POTTS Re. 22,377
KEYBOARD PERFORATOR AND COUNTER
Original Filed Dec. 23, 1931 10 Sheets-Sheet 1
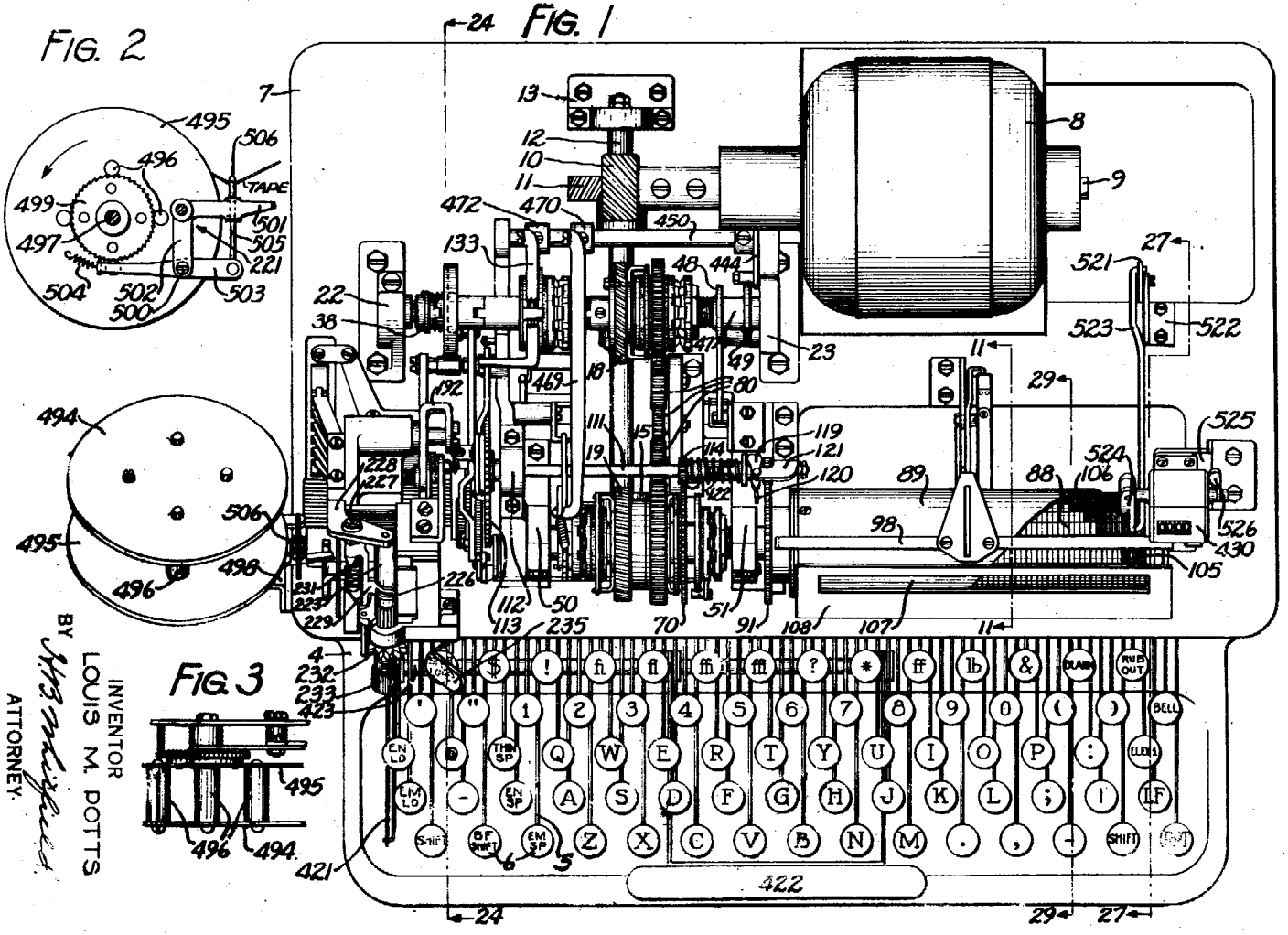
INVENTOR
LOUIS M. POTTS
BY H. B. Whitfield
ATTORNEY Sept. 14, 1943. L. M. POTTS Re. 22,377

KEYBOARD PERFORATOR AND COUNTER

Original Filed Dec. 23, 1931 10 Sheets-Sheet 2

INVENTOR
LOUIS M. POTTS
BY H. B. Whitfield
ATTORNEY

Sept. 14, 1943. L. M. POTTS Re. 22,377

KEYBOARD PERFORATOR AND COUNTER

Original Filed Dec. 23, 1931 10 Sheets-Sheet 3

INVENTOR
LOUIS M. POTTS
BY H. B. Whitfield
ATTORNEY

Sept. 14, 1943. L. M. POTTS Re. 22,377
KEYBOARD PERFORATOR AND COUNTER
Original Filed Dec. 23, 1931 10 Sheets-Sheet 4
FIG. 12
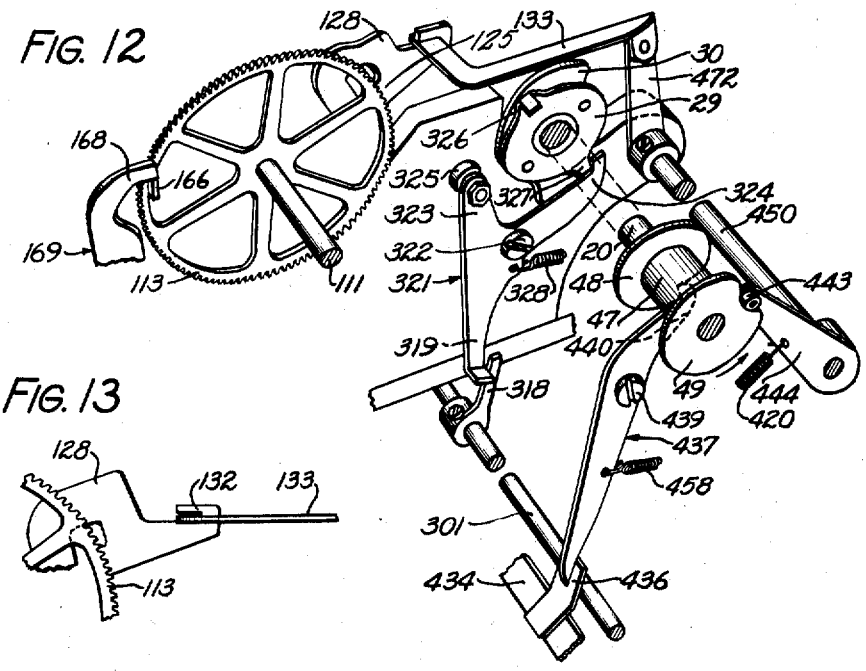
FIG. 13
FIG. 15
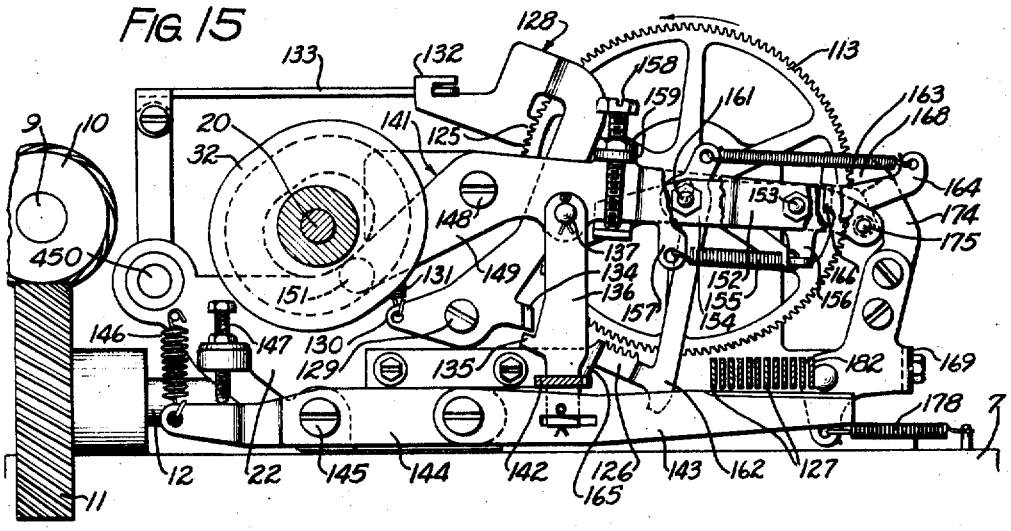
FIG. 14
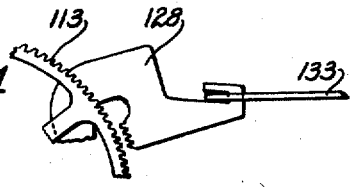
INVENTOR
LOUIS M. POTTS
BY H. B. Whitfield
ATTORNEY

KEYBOARD PERFORATOR AND COUNTER

Original Filed Dec. 23, 1931 10 Sheets-Sheet 5

INVENTOR
LOUIS M. POTTS
BY N. B. Whitfield
ATTORNEY

Sept. 14, 1943. L. M. POTTS Re. 22,377
KEYBOARD PERFORATOR AND COUNTER
Original Filed Dec. 23, 1931 10 Sheets-Sheet 6
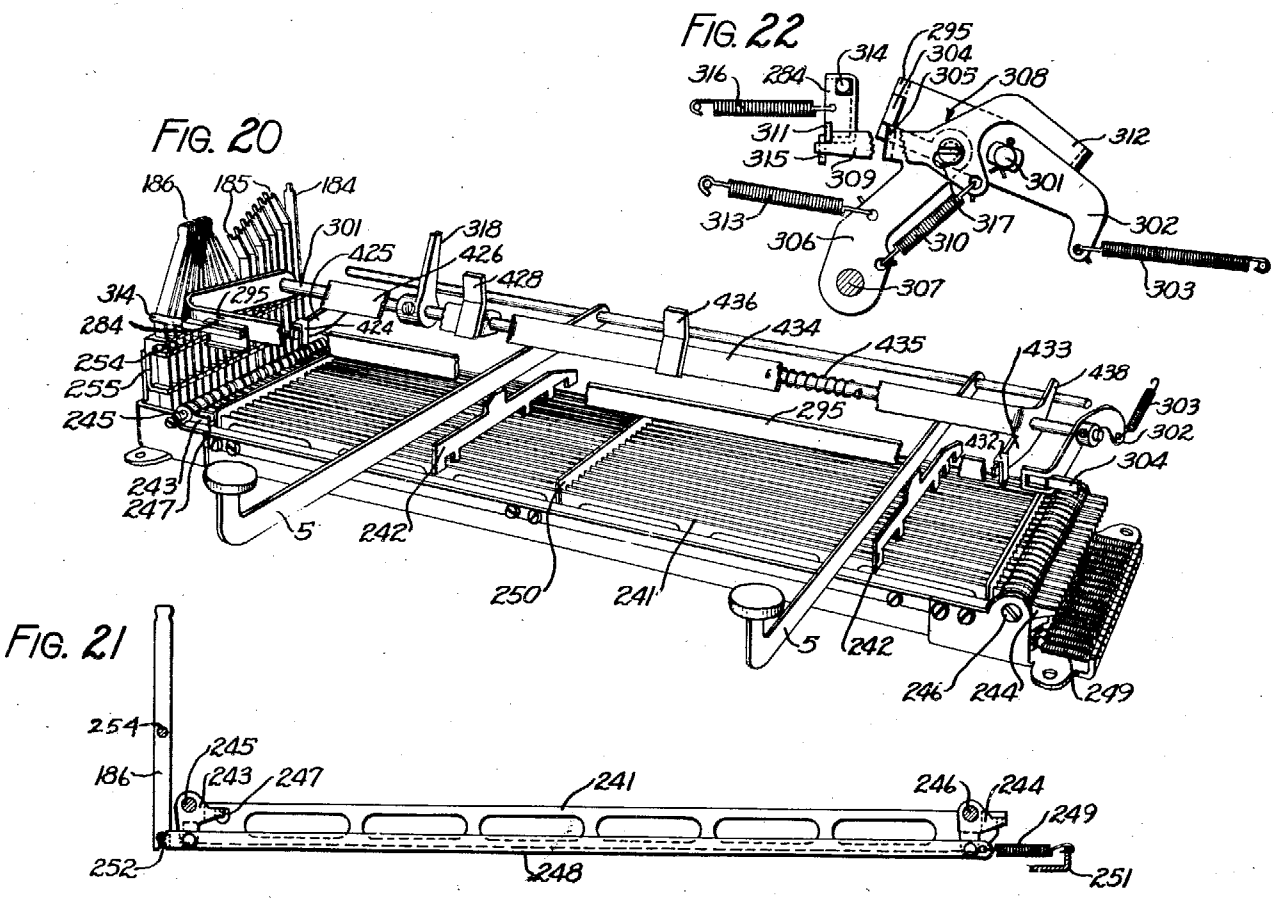
INVENTOR
LOUIS M. POTTS
BY H. B. Whitfield
ATTORNEY

KEYBOARD PERFORATOR AND COUNTER

Original Filed Dec. 23, 1931 10 Sheets-Sheet 7

INVENTOR
LOUIS M. POTTS
BY H. B. Whitfield
ATTORNEY

KEYBOARD PERFORATOR AND COUNTER

Original Filed Dec. 23, 1931 10 Sheets-Sheet 8

INVENTOR
LOUIS M. POTTS
BY H. B. Whitfield
ATTORNEY

KEYBOARD PERFORATOR AND COUNTER

Original Filed Dec. 23, 1931 10 Sheets-Sheet 9

INVENTOR
LOUIS M. POTTS
BY H. B. Whitfield
ATTORNEY

KEYBOARD PERFORATOR AND COUNTER

Original Filed Dec. 23, 1931 10 Sheets-Sheet 10

INVENTOR
LOUIS M. POTTS
BY H. B. Whitfield
ATTORNEY

Reissued Sept. 14, 1943

Re. 22,377

UNITED STATES PATENT OFFICE 22,377

KEYBOARD PERFORATOR AND COUNTER

Louis M. Potts, Evanston, Ill., assignor, by mesne assignments, to Teletypesetter Corporation, a corporation of Delaware Original No. 2,222,631, dated November 26, 1940, Serial No. 582,742, December 23, 1931. Renewed October 22, 1937. Application for reissue January 16, 1943, Serial No. 472,630

109 Claims. (Cl. 164—112)

This invention pertains to typesetting systems and apparatus therefor and more particularly to perforators and counters which may be employed for preparing perforated tapes for the automatic control of composing machines.

The device herein disclosed is especially adapted to the preparation of a perforated tape to be utilized in controlling composing machines of the line casting type. Machines of this type are provided with matrices which consists of small brass units having characters indented in the edges and which are of different thicknesses due to the fact that the characters vary in width. In view of this condition a given length of line may include a variable number of matrices depending upon the particular characters used in the line. It is obvious, therefore, that a given length of line is dependent, not upon the number of characters in the line but rather upon the thicknesses of the characters or matrices making up the line. Consequently, it is necessary in preparing the perforated tape, representing lines of composed matter, to totalize the various thicknesses of matrices corresponding to the code perforations made in the tape so that the operator will be apprised of the length of line remaining as each key is operated and can thus judge the best point at which to end a line.

Besides the usual character matrices, composing machines of the particular type to which the present invention relates are also provided with expansible justifying matrices or space bands which are adjusted between certain ranges of thickness before the casting operation is performed. The counting device here described indicates to the transmitting operator the totalized thickness of the matrices in a line during the process of composition, and it separately indicates the number as well as the minimum, maximum and variable thickness of the justifying matrices. The indicating means associated with the counting device of this invention corresponds substantially to that disclosed in U. S. Patent No. 2,000,029 granted to E. E. Kleinschmidt and Louis M. Potts.

In the typecasting machine (known broadly as "composing") an assortment of matrices of the same style or font are stored in a receptacle called a magazine, and these magazines are adapted to be utilized interchangeably in said machine. Corresponding matrices in the different fonts may vary in thickness; thus, lines of the same length but composed of a different style or font of type will contain a different number of characters per line, which may require a different degree of justification.

One of the outstanding objects of the present invention is the provision of a removable and readily interchangeable code bar unit to permit matrices of any font of type to be properly integrated or totalized by the counting device without necessitating any other change or adjustment whatever in the apparatus.

Another object of this invention is to provide a substantial overlap in the mechanical operation of the keyboard to thereby enhance the speed of operation of the apparatus.

Another object is to provide a perforator for preparing a tape to control type composing (known generally as type-casting, the term "composing" being used in its broadest sense with respect to the assembling of type to print) machines in which tape perforator the integrating or totalizing of the line of matrices is accomplished with extreme precision at high speeds.

Another object is to provide a keyboard perforator and counter that is exceptionally compact and the size of which remains unaltered regardless of the number of units into which the thickness of the matrix is divided.

Another object of the invention is to provide a means whereby perforated matter may be deleted, and simultaneously therewith the indicating device will be operated subtractively to correspond to the deletion.

A further object is to provide an arrangement for effecting the easy reading of the perforated record by directing the tape in an acclivous plane in the line of vision of the operator.

A further object is to provide a means for indicating, through the instrumentality of a signal lamp, when a justifiable line of composition has been perforated in the tape.

A still further object is to provide an indicating mechanism having a scale member matable to each code bar unit and means facilitating the insertion of an interchangeable code bar unit and its companion scale member.

It is believed that a general description of the structure for accomplishing the foregoing objects of this invention presented at this point will be conducive to a more ready understanding of the detailed description which is to follow.

The cycle of operations of the present apparatus is initiated by depressing the keys of the keyboard as is usual in devices of this kind. With each key lever there is associated a code bar individual thereto. All of these code bars are carried in a frame which is removable from the general apparatus so that a different frame with its code bars may be provided when it is desired to operate the apparatus for a different style or font of type; thus a set of code bars may be provided for each different font of type. The code bars are notched to cooperate with two sets of selector bars which are arranged transversely of the code bars.

Upon the depression of any one of the key levers a release bail common to all the key levers is operated, to in turn initiate the operation of a universal operating bail which coacts with the selected code bar and urges it against a permuted combination of the selector bars. The selector bars thus selected simultaneously effect the selection of a corresponding series of punch interference bars in the perforating apparatus and a stop bar in the counting mechanism. The stop bar thus selected corresponds to the thickness of the matrix corresponding to the key depressed.

Associated with the operating bail and operative therewith is a trip arm the function of which is to initiate the operation of the main operating shaft. The latter then proceeds to carry on the counting and perforating operations substantially simultaneously. There is carried on this main shaft a main operating cam the outer cam surface of which cooperates with a main operating lever of the perforator to effect the actuation of the punch block. This operation also effects the stepping or advancement of the tape. The inner cam surface of the main cam coacts with a main operating lever of the counting mechanism to effect in a consecutive manner the release of a fixed pawl from the counting or unit wheel and the engagement of a movable pawl to the unit wheel. The unit wheel, which tends to rotate continually then carries the movable pawl along with it until the pawl is intercepted by the previously selected stop bar. The amount of rotation of the unit wheel thus corresponds to the thickness of the matrix identified with the selected stop bar, and a corresponding rotation is imparted to the indicating mechanism through a suitable gear chain. The indicating mechanism comprises a cylindrical chart and a helical shutter such as is described and shown in the aforementioned patent.

Other objects of the invention will appear from the following description of the preferred embodiment of the invention, taken in conjunction with the accompanying drawings in which:

Fig. 1 is a plan vew of the keyboard perforator and counter constituting the invention.

Fig. 2 is a top view of the automatic tape reel.

Fig. 3 is a partial elevational view of the tape reel.

Fig. 12 is a fragmentary perspective view of the operating mechanism.

Figs. 13 and 14 are fragmentary views of the counting wheel pawl release mechanism.

Fig. 15 is an elevational view of the counting mechanism.

Fig. 20 is a perspective view of the permutation-bar unit.

Fig. 21 is a longitudinal elevational view of the permutation-bar unit.

Fig. 22 is an end view of the operating bail showing the release mechanism therefor.

Figure 36A:
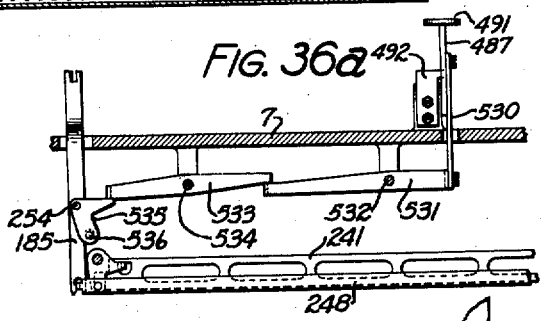
Fig. 36 is a sectional view taken on line 36—36 of Fig. 34.
Figure 34:
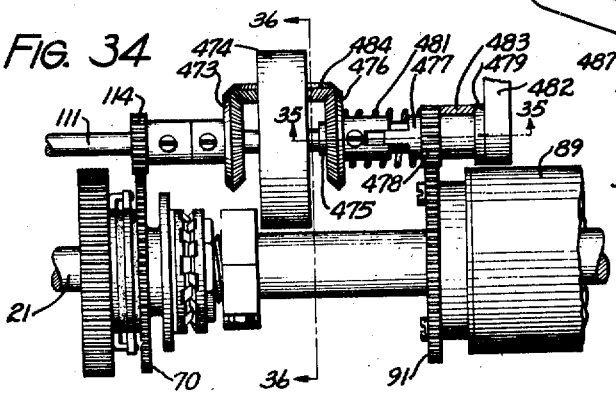
Fig. 34 is a top view of a modification showing the totalizer reversing mechanism.

Fig. 36*a* is a sectional view of the modification of Fig. 34 showing the disabling means for the perforator code selecting mechanism.

Figure 37:
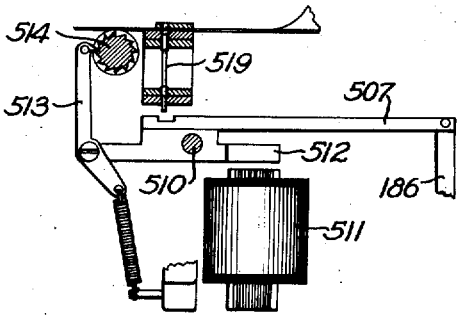

Fig. 37 is a diagrammatic view of the magnetic perforator.

Figure 38:
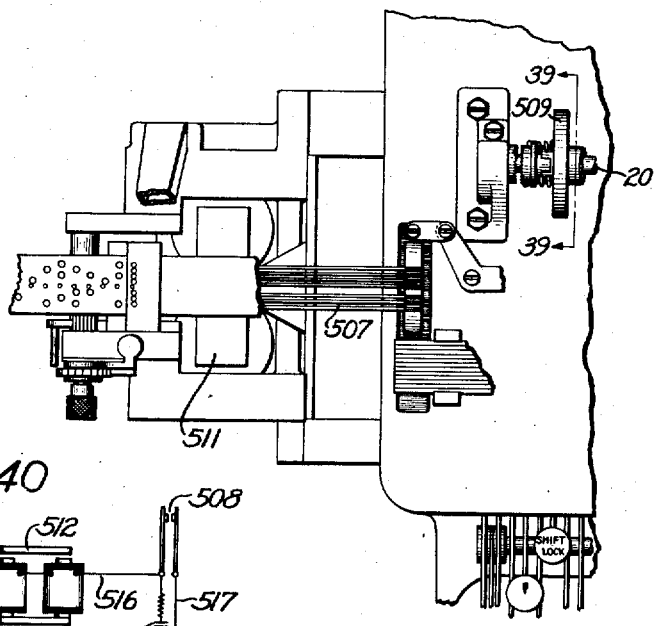

Fig. 38 is a top view of the magnetic perforator.

Figure 33:
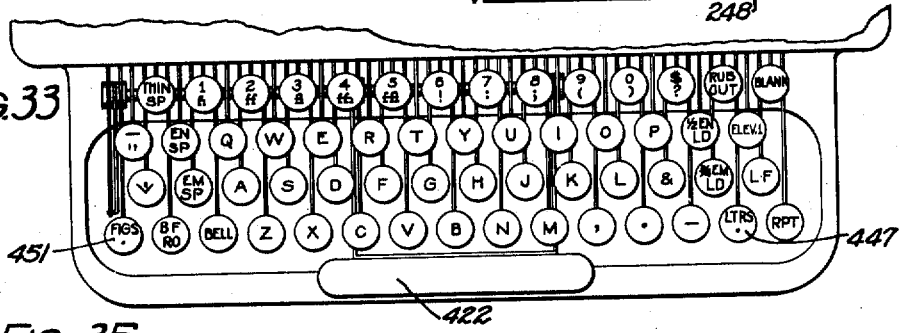
Fig. 33 illustrates the key arrangement employing the unshift and shift arrangement shown in Figs. 31 and 32, respectively.
Figure 35:
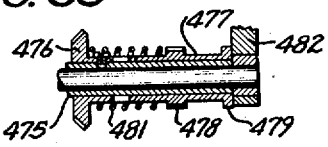
Fig. 35 is a sectional view taken on line 35—35 of Fig. 34.
Figure 39:
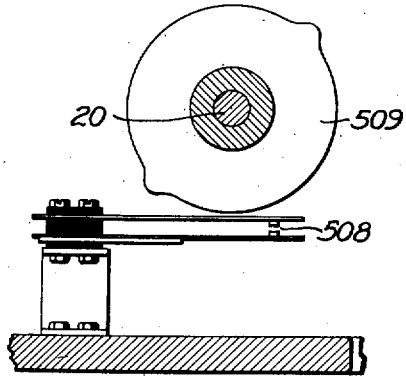

Fig. 39 is a sectional view on line 39—39 of Fig. 33 showing the operating cam mechanism for the magnetic perforator.

Figure 40:
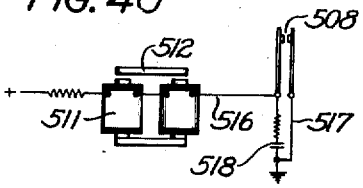

Fig. 40 is a circuit arrangement for the magnetic perforator.

Referring now to the drawings wherein the same reference numerals are used designating similar parts, the apparatus disclosed comprises a main frame 4 adapted to enclose a selector mechanism to be hereinafter described and is provided at the front with a keyboard comprising key levers 5 operable by keys 6 in the usual manner.

A cap member 7 mounted upon the frame 4 is adapted to carry a motor 8, and counting, indicating and perforating mechanisms. At the rear of the apparatus is located the motor 8 having an armature shaft 9 on which is fixed a pinion 10. Beneath the pinion 10 and in mesh therewith is a gear 11, which is fixedly mounted on power shaft 12, which is disposed transversely to the armature shaft 9 and is journaled in brackets 13 and 15. Shaft 12 also carries for rotation therewith spiral gear 16 and worm gear or pinion 17 (Fig. 4) which mesh with gears 18 and 19 on cross-shafts 20 and 21, respectively, whereby shaft 20 is adapted to rotate at a higher speed than shaft 21 for the reason that in the normal operation of the apparatus the shaft 20 rotates one-half revolution for each operation while the mechanism on shaft 21 must rotate only a small fraction of a revolution for the same operation. Also during the restoration operation, wherein the device is restored to its normal position after a cycle of operations, the shaft 20 must make substantially four revolutions while the shaft 21 makes one revolution. By completing an operation in one-half revolution the speed of rotation of the shaft 20 and the parts carried thereon is one-half of what it would be if a full revolution were used for the same maximum permissible rate of keyboard operation, thus reducing the strain and wear on the parts or making possible a higher permissible rate of operation.

The cross-shaft 20 and the mechanism thereon are shown in longitudinal section in Fig. 5 which will now be described, reference also being had to Fig. 1. Shaft 20 is journaled in anti-friction bearings suitably mounted in brackets 22 and 23 and gear 18 is secured by means of screws to a flanged collar 25 which is fixedly mounted on shaft 20. Collar 25 is articulated by means of a splined connection to a flanged sleeve 26. Loosely mounted on the sleeve 26 is a drive disc 27 which together with a flange of sleeve 26 forms a part of a friction clutch 28 and which is interposed between a pair of discs of friction material, one disc of which is interposed between the drive disc 27 and the flange of sleeve 26. The pressure upon these friction discs is supplied by a slit annular spring 24 interposed between a pair of washers capable of adjustment by a nut 34. Power from the disc 27 is communicated to a disc 29 through two diametrically opposed laterally disposed projections thereof which fit into corresponding notches in the drive disc 27. Disc 29 is secured to the reset cam 30, which is splined to the hub of an operating cam member 32 loosely mounted on shaft 20.

Adjacent the cam member 32 (Figs. 4 and 5) and also loosely mounted on shaft 20 is a driven member 33 of a toothed or grab clutch 35, the driving member 36 of which is fixed to shaft 20 and rotatable therewith. The driven member 33 is normally held out of engagement with the driving member 36 by means of the cooperative action of a cam portion 37 integral with said member 33 and a rigid stop member 38. Member 33 is articulated to cam member 32 by means of a spline connection, and is urged into meshing engagement with the driven member 36 upon its release by means of a helical compression spring 39.

It is apparent from the foregoing description that the reset cam 30 and the operating cam 32 are operable through the means of both the friction clutch 28 and the positive clutch 35. The reason for the twofold control of cams 30 and 32 is to secure the advantages of a positive grab clutch for transferring power to said cams while at the same time obviating the shock or jar due to the sudden starting by engagement of the teeth of such a clutch through the use of the friction clutch 28. In this manner the cams 30 and 32 are started slowly at first from power through the friction clutch 28 and after a short initial movement or rotation are directly and positively coupled to the drive shaft 29 through the grab clutches 35, it being noted that the initial rotation of cam 32 together with interconnected sleeve 33 has allowed said sleeve 33 to move slowly to the left, due to the cooperation of cam surface 37 and follower 38, into engagement with the fixed portion 38 of the clutch 35.

To the right of gear 19 (as viewed in Fig. 5) and loosely mounted on the shaft 20 is a flanged sleeve portion 40 upon which is mounted a friction clutch which is similar to that associated with sleeve member 26. A drive disc 41 and a gear 42 are interposed between friction discs which are in turn adjustably compressed by the cooperation of spring 43 and nut 45 in the same manner as in clutch 28. Disc 41 is articulated to gear 18 by means of a driving connection 46 similar to connection 29.

To the right of sleeve 40 and splined thereto is a sleeve member 47 which is also loosely mounted on shaft 20. Sleeve member 47 is provided with two integral portions; namely, stop disc 48 and cam 49, the functions of which will hereinafter appear.

Figure 6:
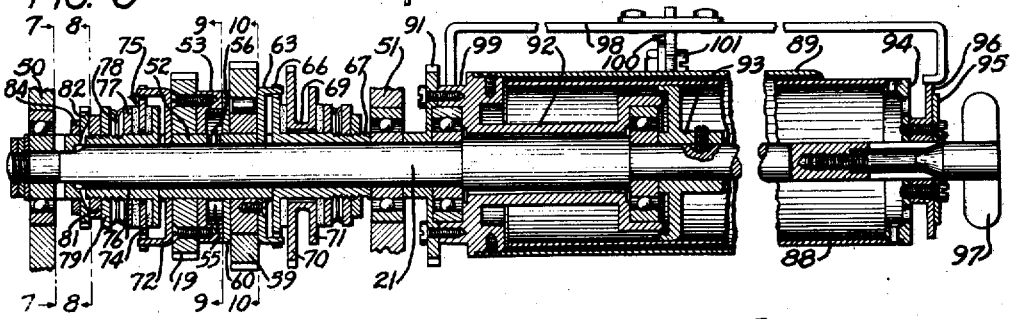
Fig. 6 is a longitudinal sectional view of the indicating shaft.

The cross-shaft 21 and the mechanism thereon is illustrated in Fig. 6, a description of which will now be given, reference being had also to Fig. 1. Shaft 21 is journaled in anti-friction bearings suitably mounted in the brackets 50 and 51, and is adapted by reason of the rigidity of the shaft to extend to the right beyond the bearing 51 to permit the interchangeability of the cylindrical scale member of an indicating device.

Figure 9:
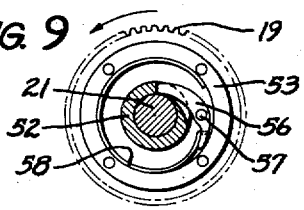
Fig. 9 is a cross-sectional view taken on line 9—9 of Fig. 6.

It has already been noted that gear 19 is carried by shaft 21. From Fig. 6 it will be observed that gear 19 is mounted on a sleeve member 52 and that secured thereto and rotatable therewith is a housing member 53, into the recess 55 of which is placed a pawl 56, which is pivoted at 57 (Fig. 9) and which is normally urged in a counterclockwise direction by a spring 58. The sleeve member 52 is slotted in a suitable manner, as shown in Figs. 6 and 9, to cooperate with pawl 56, thus when gear 19 is rotated in a counterclockwise direction (as viewed in Fig. 9), the sleeve 52 through the cooperation of pawl 56 will be rotated in the same direction. Thus pawl 56 is normally effective to impart the rotative motion of gear 19 to sleeve 52.

Figure 10:
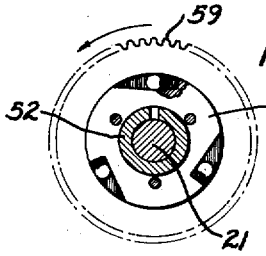
Fig. 10 is a cross-sectional view taken on line 10—10 of Fig. 6.

Interposed between the housing 53 and the gear 59 is a washer 60, which as shown in Fig. 10 is a part of a roller bearing grip-clutch 61 mounted on the sleeve 52. To the inner member of clutch 61 is secured a drive connection 63 (Fig. 6) the laterally disposed lugs of which cooperate with corresponding notches in a flange 66 of a flanged sleeve 67. Drive connection 63 is also keyed to the sleeve 52. The sleeve member 67 carries a friction clutch of similar design to that previously described, that part of the clutch interposed between the pair of friction discs being a double-flanged sleeve 69, one flange 70 of which is provided on its periphery with gear teeth and the other flange 71 provided around its periphery with a cam surface to operate respective elements, the functions of which will hereinafter appear.

The purpose of the roller clutch 61 is to effect a rapid return of the counting and indicating mechanism in the following manner. As previously mentioned, the speed of rotation imparted to shaft 20 by gear 16 is normally greater than the speed imparted to shaft 21 by pinion 17. Thus to impart to shaft 21 substantially the same speed as shaft 20 when it is desired to return the counting and indicating mechanism to the initial or beginning-of-line position, a train of gears 80 (Fig. 1) is provided to connect gear 42 on shaft 20 with gear 59 on shaft 21 so that when gear 42 is released for rotation, as will hereinafter appear, its rotation will be at once imparted through gears 80 to gear 59. It is thus seen that gear 19 (which rotates constantly) and gear 59 will for a brief period be rotating simultaneously but at different speeds, gear 59 rotating faster than gear 19. This being so, gear 59 will supervene gear 19 and, through roller clutch 61, will impart its faster rotation to sleeve 52. Gear 19 and pawl 56 will thus appear to lag behind, and sleeve 52 will thus be rotated by means of the roller clutch 61 instead of pawl 56, until the counting and indicating mechanisms have reached the beginning-of-line position and have stopped thereat, whereupon sleeve 52 will have stopped and pawl 56 will continue to advance until it again engages the slot in sleeve 52.

A drive connection 72 is secured to the left side of gear 19 (Fig. 6) and is keyed to sleeve 52. Drive connection 72 is provided with lugs cooperating with corresponding notches in a drive disc 74 which is a part of a friction clutch 75. Disc 74 is interposed between a pair of discs of friction material which are in turn held between the flange of a flanged sleeve 76, juxtapositioned to sleeve 52 on shaft 21, and a washer 77. The pressure upon these friction discs is supplied by a slit annular spring 78 adjustably interposed between washer 77 and nut 79, the adjustment being maintained by lock nut 81.

Figure 7:
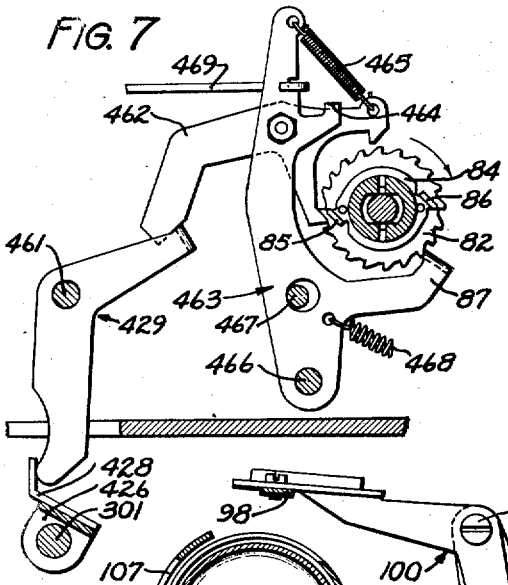
Fig. 7 is a sectional view taken on line 7—7 of Fig. 6 showing the space band counting mechanism.
Figure 8:
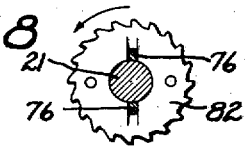
Fig. 8 is a cross-sectional view taken on line 8—8 of Fig. 6.

The end of sleeve 76 is formed to fit into a slot in a ratchet 82, Figs. 6 and 8, which is rotatably mounted on shaft 21. Fixed to ratchet 82 is the stop disc 84 provided with a pair of diametrically opposed integral stop lugs 85 and 86 (Fig. 7) cooperating with stop arm 87 to effect the restoration of a cylindrical chart 88 to its beginning-of-line position.

The indicating device, which comprises mainly the cylindrical chart 88 displaying a series of scales and a helical shutter 89, substantially as set forth in the aforementioned patent, is mounted on the shaft 21 to the right of bearing 51. As described in said patent, the circumference of the chart 88 is divided into twenty spaces, each space representing a scale. The chart 88 has two similar halves, each half comprising ten scales. The top scale in each half has provision for nine space bands, the greatest number needed for a single line of composition. The bottom scale in each half provides no space bands and is called the zero scale and is that point to which the chart is returned for the beginning of a new line. These series of scales are used alternately, thus after one of the series of scales has been used the chart will be rotated so that the zero position of the other series of scales will assume the beginning-of-line position. The advantage of this arrangement of scales will become apparent when it is seen that it is necessary to rotate the chart only one-half revolution or less to the zero position instead of twice that amount, thus saving considerable time and enhancing the speed of operation of the apparatus.

Loosely mounted on shaft 21 and immediately adjacent bearing 51 is gear 91. As noted in Fig. 6, shaft 21 is provided with an enlarged portion for part of its length. Abutting the shoulders thus provided at each end of the enlarged portion of the shaft are anti-friction bearings adapted to carry a sleeve member 92, which is provided with suitable sockets to receive the anti-friction bearings. Sleeve member 92 is secured to gear 91, thus providing a suitable enclosure for the adjacent anti-friction bearing and has secured to it, in a manner substantially as shown in Fig. 6, the helical shutter 89.

Immediately to the right of sleeve 92 is a flanged member 93 which supports one end of the cylindrical chart 88, the diameter of the flange being substantially equivalent to the inside diameter of cylindrical chart 88. The hub portion of member 93 is secured by means of a screw to shaft 21 with which it rotates. Member 93 also serves as a retainer for the anti-friction bearing.

Figure 11:
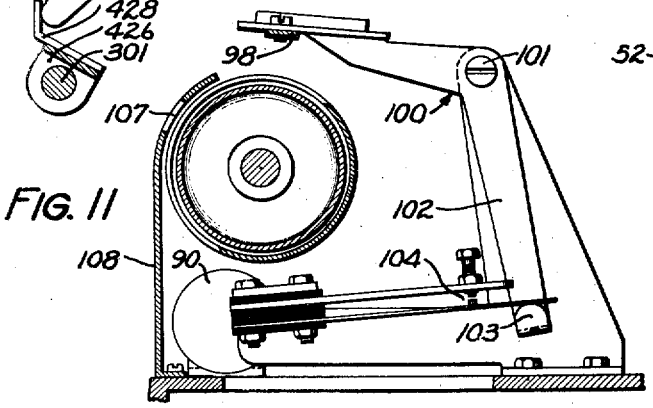
Fig. 11 is a cross-sectional view taken on line 11—11 of Fig. 1.

The cylindrical chart 88 is riveted to a cap member 94. Adapted to be held by means of a slot and screw adjustment between cover plate 95 and cap member 94 is a cam member 96, the function of which is to control the operation of a signal lamp 90 (Fig. 11). The right hand end of chart 88 through member 94 is supported at the end of shaft 21 and is held fast to the shaft by means of a specially designed thumb screw 97. To accomplish this, the end of the shaft is drilled and tapped, and then counterbored to suit the tapered shoulder of thumb screw 97. The end of the shaft is also slit diametrically for an appropriate distance sufficient to permit the tightening of the screw to expand the sides of the slit shaft thus filling the hole in member 94, the further tightening of screw 97 acting to grip and hold fast said cap 94. It is thus seen that chart 88 is adjustably mountable to permit of the correct registry of the zero scale on the chart with a slot 107 (Fig. 1). Also, by means of this construction, the chart 88 is removable and may thus be readily interchanged with similar charts bearing graduations corresponding to other styles of type, since the thicknesses of the matrices of corresponding characters vary according to the styles of type.

Having reference to Fig. 1, it will be noted that associated with the indicating mechanism is a bar 98 which straddles the chart and shutter, and which is provided with depending ends adapted to function as cam followers to coact with cam 96 and a cam surface 99 provided on the sleeve member 92 (Fig. 6). Bar 98 is secured to bell crank lever 100 (Figs. 1 and 11) which is pivoted at 101, arm 102 of which is provided with a reverted end 103 coacting with the lower contact spring of spring contact 104. The closing of contact 104 completes a circuit for the signal lamp 90 (Fig. 11), the function of which, when lighted, is to apprise the operator of the approach of the end of the line.

As fully disclosed in the aforementioned patent, chart 88 is provided with a series of scales, all except two of which are provided with a heavily shaded portion 105 (Fig. 1) and a lightly shaded portion 106, the lightly shaded portion 106 representing the amount of justification possible in a line containing one or more space bands. As shown in Figs. 1 and 11, chart 88 is located to the rear and adjacent slot 107 in a part of cover 108 of the machine, so that as chart 88 is revolved into different positions, in a manner hereinafter described, only one of the scales will show through the slot.

As is understood from the aforementioned patent, shutter 89 is caused to revolve a predetermined amount upon the depression of each character key 6 and the edge of the shutter showing through the slot 107 appears to move to the right toward the end-of-line position, and as the shutter does so, cam surface 99 coacts with the left hand end of bar 98 to raise said bar and in turn cause lever 100 to rotate to effect the closing of contact 104 to light the signal lamp 90. Now, since the amount of line to be filled with characters varies with the number of space bands used in the line, and since the number of space bands in the line governs the amount of justification required it is apparent that as more space bands are used in a line less characters can be placed in the same line so that it becomes necessary in this event to apprise the operator sooner of the arrival of a justifiable line. To accomplish this cam 96, previously described, has been provided which coacts with the right hand depending end of bar 98 to operate lever 100 in the same manner as by means of cam surface 99. The purpose of this dual action on lever 101 is to apprise the operator, through the combined action of cams 96 and 99, the contours of which are cooperatively related, of the arrival of a justifiable line; that is, that the line is reaching a suitable length to permit automatic justification is indicated by the lighting of the signal lamp 90 controlled by the lever 101. In effect, what takes place is that, as the chart is revolved step-by-step in response to the depression of the space (or space band) key, the right hand end of bar 98 is raised slightly upward thus accelerating the flashing of the signal by rotation of shutter member 89 which effects the raising of the left hand end.

Positioned to the rear of shaft 21 and disposed parallel thereto is a unit wheel shaft 111 (Fig. 4) which is suitably journaled in anti-friction bearings mounted in brackets 112 and 51. Unit wheel 113 is affixed to shaft 111 at its left hand end, as viewed in Fig. 1, the periphery of which is provided with numerous gear teeth of a rather fine pitch so as to permit the division of the matrix widths into small units, thus affording greater accuracy in the counting operation. In order that the counting may be accurate and the number of different thicknesses of matrices may be a minimum, each em, the unit of type measure, is divided into eighteen equal subunits; eighteen having been found by experience to be a suitable number. Matrices of certain number of units in thickness are not used, that is, no matrices as thin as one, two, or three units are used, and twelve different thicknesses have been found to be all that are required. Each tooth on the unit wheel corresponds to one unit of these sub-units, the teeth on gears 70 and 114 have been so chosen that each tooth corresponds to one-half em so that the length of line may be adjusted to one-half em.

In mesh with gear 70 is a pinion 114 integral with sleeve 115 (Fig. 4) which is fixedly mounted on shaft 111. Loosely mounted on shaft 111 and having a splined connection with the fixed sleeve 115 is sleeve member 116. Integral with sleeve 116 and oppositely disposed to the splined connection is pinion 117 corresponding to pinion 114. Pinion 117 is normally in mesh with gear 91 on shutter member 89. Sleeve 116 is also provided with a flange 118, thus forming between flange 118 and pinion 117 an annular groove in which is disposed one end of release lever 119 (Fig. 1) which is pivoted on a suitable bracket 121, the other end 120 of the lever being formed into a thumb portion whereby lever 119 may readily be manually rotated in a counterclockwise direction (as viewed in Fig. 1) to shift sleeve member 116 thereby to the left against the action of a helical spring 122 and effect the de-meshing of pinion 117 from gear 91 to enable shutter 89 to be manually and adjustably rotated to correspond to the length of line to be composed.

As previously noted the pinions 114 and 117 are normally in mesh with gears 70 and 91, respectively, and gear 70 due to its frictional connection to shaft 21 constantly tends to rotate, and when permitted to do so upon the release of unit wheel 113, it causes said unit wheel and gears 114 and 117 to rotate a predetermined amount to transfer, in turn, the rotation thereof to gear 91 and hence to shutter 89.

*Matrix thickness counting mechanism*

Figure 4:
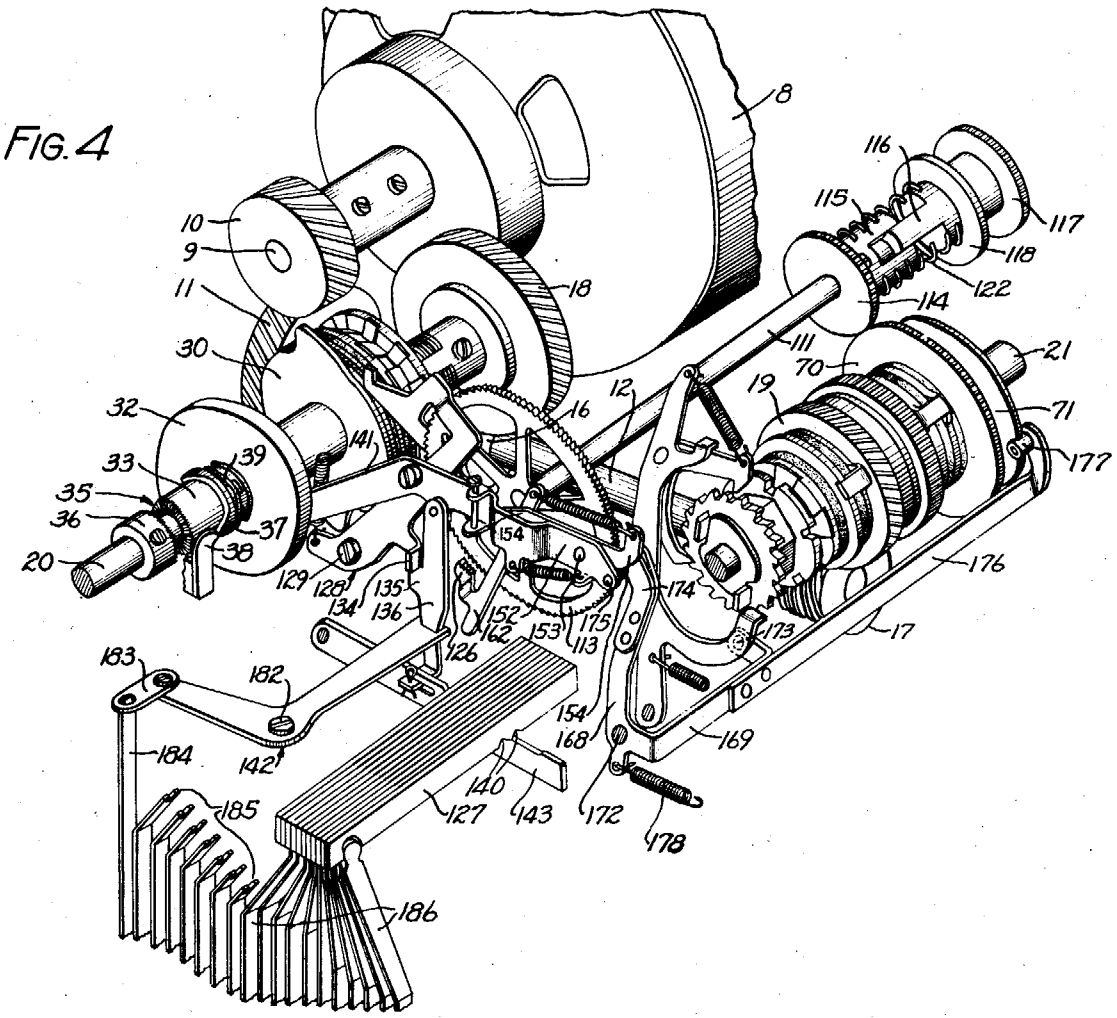
Fig. 4 is a perspective view of the counting mechanism.

Having reference to Figs. 4 and 15, the operation of unit wheel 113 and its associated parts will now be described. As has been previously noted unit wheel 113 constantly tends to rotate by reason of its relation to gear 70. However, its rotation is controlled normally by pawls 125 and 126, one or the other of said pawls being in engagement with the unit wheel during the counting operation. During the restoration of the counting mechanism to begin a new line, however, both pawls are released simultaneously, thus allowing the unit wheel to rotate freely to the beginning-of-line position. Briefly, during the counting operation pawls 125 and 126 are operated so as to bring pawl 125 out of engagement and pawl 126 into engagement with unit wheel 113 substantially simultaneously (a slight overlap being provided to prevent the escape of the unit wheel), the effect being to permit unit wheel 113 to carry pawl 126 toward the right until it is arrested by a selected one of stop bars 127, at which time pawl 126 is again brought out of engagement and pawl 125 into engagement with unit wheel 113 substantially simultaneously thus preventing further rotation of unit wheel 113 while pawl 126 returns to its original position. With this brief preliminary description of operation the construction of the mechanism will now be given in detail.

Pawl 125 is an integral part of lever 128 which is pivoted at 129 to bracket 22, which bracket, as previously noted, also provides a bearing for shaft 20. Lever 128 normally tends to rotate in a clockwise direction about its pivot 129 due to the tension of spring 131, one end of which is secured to arm 130 of lever 128 and the other end (not shown) being suitably connected to a post mounted on bracket 22. Pawl 125 thus is maintained normally in meshing engagement with unit wheel 113. Lever 128 is also provided with hook portion 132 adapted to cooperate with a release bar 133, which functions as determined by the operation of the mechanism to restore the unit wheel to its normal or starting position, and has a projection 134 which cooperates with a projection 135 on the lever 136 which is pivoted at 137 to operating lever 141. Operating lever 141 is pivotally mounted on a stud 142 secured to bracket 22. The end of arm 149 is provided with a cam follower roller 151 adapted to operate in a cam groove in operating cam 32. Oscillatory motion thus is imparted to operating lever 141 in properly timed relation with the several functions of the apparatus. Lever 136 is articulated to bell crank 142, which is more clearly shown in Fig. 4, and has its lower end laterally disposed and engaged in a slot in detent member 143, a cotter pin being provided to prevent their disengagement. Detent member 143 is pivotally connected to the end of detent adjusting lever 144 which is pivoted to bracket 22 at 145 and which may be adjusted by spring 146 and screw 147 in a well known manner.

The upper edge of lever 143 near its free end is beveled to cooperate with corresponding V-notches 140 (Fig. 4) in the bottom edges of stop bars 127 so as to hold or detain the selected stop bar in its selected position during the counting operation.

A lever 154 (Figs. 4 and 15) is pivotally secured to arm 152 at 153 and normally tends to rotate in a counter-clockwise direction due to the tension of spring 155 one end of which is attached to lug 156 of lever 154 and the other end being attached to lug 157 of lever arm 152. This rotative movement is arrested by adjusting screw 158 mounted on a laterally disposed lug 159 on arm 152.

Pivotally connected at 161 to lever 154 is a unit wheel stop lever 162 integral with which and located near its lower end is the aforementioned pawl 126. The upper arm of lever 162 has attached thereto one end of spring 163 the other end of which is secured to the end of arm 164 of lever 154. Due to the tension of spring 163, lever 162 is biased toward the left (as viewed in Fig. 15) and is normally held against an adjustable stop member 165. In operation, as will presently appear, pivot 161 is brought into coincidence with the center of unit wheel 113.

Unit wheel 113 is provided with lug 166 (Figs. 12 and 15). Lug 166 assumes the position shown when unit wheel 113 is in its stop position at which time lug 166 abuts arm 168 of stop lever 169. Lever 169 comprises a U-shaped attaching portion (Fig. 4) pivotally secured at pivots 172 and 173. Lever 169 is provided with arm 174 adjacent to and in spaced relation with arm 168, which arm 174 co-acts with stud 175 secured to the end of arm 152 of lever 141, the purpose of which will presently appear. Lever 169 is also provided with an extension 176 (Fig. 4) supporting at its extremity a follower roller 177 which coacts with cam 71. Lever 169 normally tends to rotate in a counter-clockwise direction due to the tension of spring 178, one end of which is attached to lever 169 and the other end to a spring post, suitably mounted on the frame of the apparatus.

The operation of the mechanism shown in Fig. 15 will now be given wherein it is shown in its normal stop position. One complete operation of the counting mechanism is performed during each one-half revolution of operating cam 32. Upon initiation of rotation of cam 32 and during the first 90° of its rotation lever 141 is rotated in a counter-clockwise direction carrying with it its associated parts; namely, levers 136, 143, 154 and 162. During the early part of this counter-clockwise movement pawl 126 is brought into meshing engagement with the unit wheel, after which lug 135 of lever 136 in its upward movement intercepts lug 134 of lever 128 and causes, by its continued upward movement, lever 128 to rotate in a counter-clockwise direction against the action of spring 131 thus causing pawl 125 to become disengaged from unit wheel 113. Simultaneously with the disengagement of pawl 125 occurs the disengagement of lever arm 168 from the lug 166 by means of the camming action of stud 175 on arm 174 which action causes lever 169 to rotate slightly in a clockwise direction about its pivots 172 and 173 against the action of spring 178. At the same time, detent lever 143 is lifted into the notches in the bottom edges of the stop bars to hold the bars immovable during the counting operation.

As previously noted, unit wheel 113 normally tends to rotate in the direction indicated by the arrow unless restrained by pawls 125 or 126, or lever arm 168. Pawl 126 now being in engagement with unit wheel 113 and being free of restraint is adapted to be carried along with its lever 162 by the unit wheel until arrested by one of the stop bars 127, which, as observed in Fig. 4, is adapted to be moved into the path of lever 162. Stop bar 182 (Fig. 15) is a fixed stop bar and represents the maximum thickness of matrix. Lever 162 thus has been rotated against the action of spring 163 so that when operating lever 141 is rotated in a clockwise direction during the second 90° movement of cam 32 lever 162 is lowered thus causing the disengagement of pawl 126 and permitting lever 162 to be swung back by the tension of spring 163 to the stop 165. However, before pawl 126 becomes completely disengaged, pawl 125 engages the unit wheel due to the retraction of lug 135 and thus prevents the rotation of the unit wheel while pawl 126 is being restored to its normal position.

It is apparent now that stop lug 166 of unit wheel 113 has moved past the stop arm 168. It is also apparent that, due to the camming-out action of stud 175 on arm 174, stop arm 168 will never interfere with the rotation of the unit wheel during the counting operation because of the fact that every time the counting operation is effected the operating lever 141 is actuated and hence the camming action of stud 175 on arm 174 is automatically brought into play. As will presently appear, lever 169 is also acted upon by cam 71 through follower roller 177 during the time that unit wheel 113 is rotated to its beginning-of-line position, in which event the function of stop lug 166 will become apparent.

Figure 16:
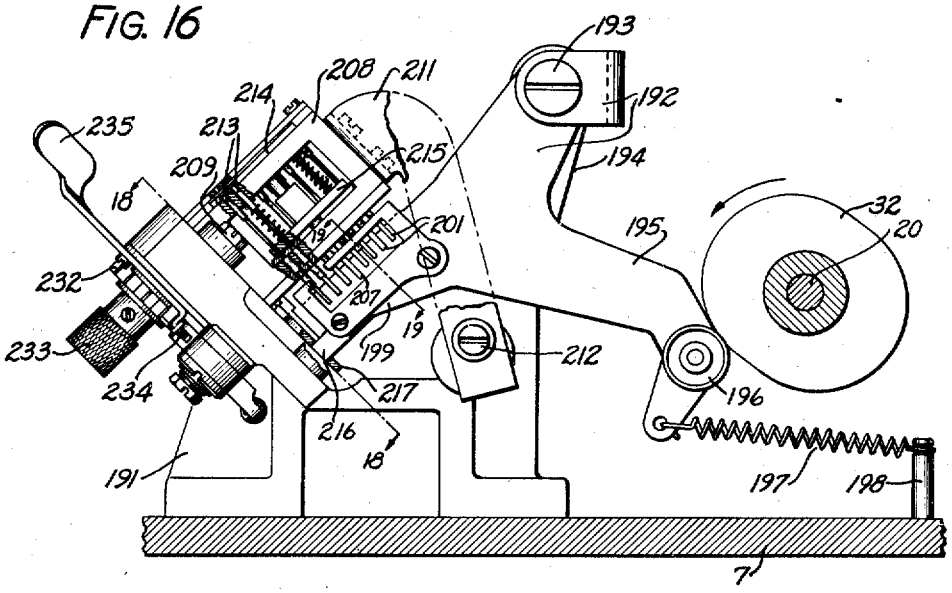
Figs. 16 and 17 are elevational views of the perforating device.
Figure 17:
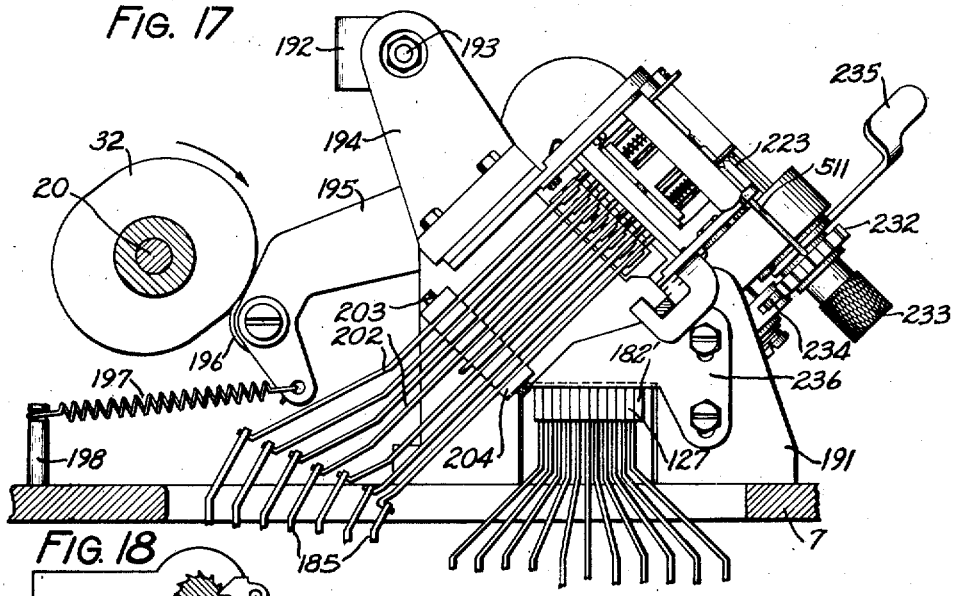

As will appear from the ensuing disclosure, operating cam 32 also controls the operation of the perforating mechanism, Figs. 1, 16 and 17. Normally the counting and perforating operations are performed simultaneously, but since there are certain special perforating operations which must be performed without the counting operation; for example, spacing, shift, elevator or carriage return and line feed, provision has been made to render the counting mechanism inoperative. For this purpose the previously mentioned lever 142 (Figs. 4 and 15) has been provided, which is suitably pivoted at 182 to the frame and has one arm articulated to lever 136 and to the other arm is pivotally connected a link 183 which is in turn pivotally connected to lever 184. Incidentally, lever 184 is one of a series of levers 184, 185 and 186 (Fig. 4) which are adapted to transfer the setting of the selector mechanism to the counting and perforating mechanisms, as will hereinafter appear.

When the keys controlling the above mentioned special operations are depressed lever 184 is operated in a manner hereinafter described to cause lever 142 to rotate in a clockwise direction (as viewed in Fig. 4), which action throws lever 136 to the right thus preventing lug 135 from intercepting lug 134 as heretofore thereby preventing the disengagement of pawl 125 from unit wheel 113. Operating lever 141 thus is oscillated without effecting the rotation of the unit wheel.

Mounted on cap member 7 immediately to the left of the counting wheel 113 and its associated mechanism (as viewed in Fig. 1) is the perforating mechanism, shown in detail in Figs. 16 to 19. Heretofore in devices of the kind herein disclosed a perforating mechanism has always been provided with a horizontal punch block thus rendering it difficult and even impossible for the operator to readily check the result of his work. An important feature of the present apparatus is the provision of a sloping punch block, thus presenting the perforated tape at all times to the full view of the operator.

*Perforating mechanism*

Referring to Figs. 16 and 17, the perforating unit comprises essentially a frame 191 removably mounted on cap member 7. Frame 191 is adapted to span the counter stop-bars 127 and is provided with an adjustably mounted plate 236 which is adapted to guide the bars 127. Punch operating lever 192 is pivotally mounted on stud 193 secured to arm 194 of frame 191. As clearly shown in Fig. 1 the fulcrum portion of lever 192 is of U-shaped conformation to provide a double bearing on stud 193 to compensate for the eccentric load imposed on the lever 192. Mounted on arm 195 of lever 192 is a follower roller 196 which co-acts with the periphery of the operating cam 32. Roller 196 is constantly held in contact with cam 32 by the action of spring 197 one end of which is secured to the extremity of arm 195 and the other end is attached to spring post 198.

Figure 19:
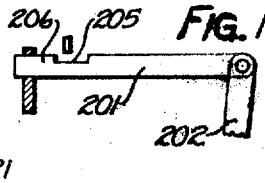
Fig. 19 is a sectional view taken on line 19—19 of Fig. 16.

Arm 199 of lever 192 is provided with a series of rectangular holes adapted to receive punch interference bars 201 and in which the bars 201 are slidable. As indicated in Fig. 19, the interference bars 201 are each pivotally connected to individual controlling levers 202, which as shown in Fig. 17 are pivotally mounted on a common pivot shaft 203 suitably carried in notched bracket 204 integral with frame 191. The lower ends of levers 202 are pivotally articulated to levers 185. Interference bars 201 are each provided with a notch 205 (as seen in Fig. 19) so that when a bar 201 is not selected its corresponding punch will not be operated; but when a bar 201 is moved to the right (Fig. 19) upon being selected, the shoulder 206 will be presented below its associated punch such that when the interference bars are raised the punch will be operated. Interference bar 207 is permanently fixed and is not provided with a notch 205 since this bar controls the feed hole punch which is invariably operated.

Mounted obliquely above punch interference bars 201 (Fig. 16) and in co-operative relationship therewith is the punch block 208, which may be of any suitable construction. In the present embodiment, however, punch block 208 comprises substantially a rectangular frame fixed to frame 191 at 209 and supported on the opposite side by bracket 211, which in turn is secured to frame 191 by screws 212. Mounted in frame 208 in alignment are the punches 213 (eight in the present embodiment) one of which is the smaller diameter feed hole punch and the remaining are the code hole punches (see Fig. 1) the punches co-acting with a female die plate 214. The punches are provided near their lower ends with shoulders cooperating with a spring controlled stripper plate 215 of familiar construction.

The perforator is here shown as a seven-unit code perforator, whereby tape may be perforated in accordance with a seven-unit code. It is, of course, apparent that the perforator herein shown can readily be adapted to the preparation of perforated tape according to a code comprising any number of elements; thus hereinafter will be described a modification of the present invention adapted to the production of tape conformable to a six-unit code.

Figure 18:
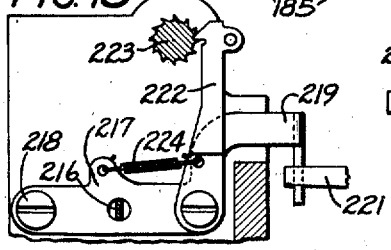
Fig. 18 is a sectional view taken on line 18—18 of Fig. 16.

As shown in Fig. 16, arm 199 of lever 192 is provided at its extremity with a tongue 216 fitted into a groove in tape feed lever 217. The tape feed lever 217 as shown in Fig. 18, is pivotally mounted to the frame 191 at 218 and is provided at its extremity with a hook portion 219 co-operating with the end of tape reel lever 221, as will presently appear.

Pivotally mounted on lever 217 near its outer end is tape feed pawl 222 which is held into co-operative relation with feed roller 223 by spring 224 one end of which is secured to pawl 222 and the other end attached to a lug on lever 217.

The feed roller 223 as indicated in Fig. 1, is provided with feed pins 226, in spaced relation to each other and circumferentially arranged about the roller. Suitably mounted on stud 227 secured to feed roller support 228 and co-operating with feed pins 226 is pressure member 229, constant pressure being exerted by coil spring 231. The outer end of feed roller 223 is provided with a star wheel 232 and knurled end 233 for manual operation. Associated with star wheel 232 is a detent member 234 (Fig. 17) operable after the usual fashion. A back-space lever 235 operable on star wheel 232 in a well known manner is also provided.

A description of the operation of the perforating mechanism will now be given. As already alluded to, the operation of the perforating mechanism proceeds simultaneously with the operation of the counting mechanism and similarly as mentioned in connection with the latter one complete operation is performed during each one-half revolution of operating cam 32. Thus during the first one-fourth revolution of cam 32, clockwise rotation to a limited extent is imparted to lever 192 against the action of spring 197 thereby causing interference bars 201 to rotate in a like direction about their pivotal connections with levers 202, and in the event that any of the bars 201 are selected and thus are in their right hand position (Fig. 19), the shoulder 206 thereof will intercept the corresponding punch and effect the perforation of a corresponding hole in the tape (which it has been presumed has been properly inserted in the punch block preparatory to perforating).

Simultaneously with the perforating operation, tape-feed lever 217 (Fig. 18) is caused to rotate a predetermined amount in a counter-clockwise direction about its pivot 218 by reason of its connection with tongue 216 of lever 192, thus raising the pawl 222 to engage the next tooth of the feed roller whereby, when operating lever 192 is returned to its normal position, lever 217 is also actuated in a reverse direction to thereby effect the rotation of the feed roller and hence to effect the stepping of the tape.

In actual practice the perforating mechanism is operated rapidly and thus the sudden motion of lever 217 causes lever 221 through its engagement with hook portion 219 to be thrown sharply upward thus tending to whirl the tape winding reel, thereby providing an automatic take-up and preventing the perforated tape from becoming broken, as would result if a spring tightening means were provided. The automatic tape winder will be hereinafter fully described.

*Permutation bar unit*

Arranged below the key levers 5 (Fig. 20) and disposed transversely therewith are a plurality of permutation bars 241. Interposed between key levers 5 and permutation bars 241 are notched code bars 242, one code bar being provided for each key lever 5, said code bars being disposed parallel to and in edgewise relation to its corresponding key lever. Code bars 242 are provided with notches arranged in accordance with a permutation code in a well known manner.

Each permutation bar 241 (Fig. 21) is carried by a pair of bell crank rocking members 243 and 244, which are pivotally carried on pivot rods 245 and 246 respectively. Each member 243 and 244 is provided with an ear 247 extending backward on which bars 241 are carried. The ends of the depending arms of each pair of members 243 and 244 are pivotally connected to a horizontal bar 248 which extends beyond each of said connections, one end being spring connected by spring 249 to a common spring support 251. The other extended end is provided with an ear 252 adapted to fit into a notch in the associated lever 184, 185 or 186. Permutation bars 241 are maintained in spaced relation and are slidably held in guide combs 250, suitably secured to the sides of the permutation bar frame, which is mounted as a unit in the main frame 4.

It has already been noted that the bottom edges of code bars 242 are provided with permutation code notches. Thus each code bar normally operates simultaneously one of the permutation bars 241 associated with levers 186 and a permuted combination of bars 241 associated with levers 185. However, whenever a function key is operated, none of the bars associated with levers 186 is actuated, but the bar 241 associated with lever 184 is actuated in its stead, the effect of thus operating lever 184 having been described as actuating bell crank 142 (Fig. 4) to effect the inoperativeness of lever 136 upon lever 128.

Levers 184, 185 and 186 as indicated in Fig. 20, are pivotally carried on common pivot shaft 254 suitably mounted in frame 255, and as already noted these levers are operatively connected to link 183 (Fig. 4), levers 202 and stop-bars 127 (Fig. 17), respectively. When any one of the bars 241 is depressed by the operation of a key lever 5 through the medium of the corresponding code bar 242, bell cranks 243 and 244 associated with the actuated bar 241 will be rotated in a clockwise direction (as viewed in Fig. 21) thus urging the corresponding bar 248 toward the left against the action of its spring 249 to effect the rotation of the corresponding lever 184, 185 or 186 about the common pivot shaft 254. The rotation of lever 184 effects through link 183 the rotation of lever 142 (Fig. 4) to shift lever 136 so as to prevent lug 135 from intercepting lug 134 as previously described.

The rotation of levers 185 effects through levers 202 (Fig. 17) the operation of the selected interference bar 201, as previously mentioned. Lastly, the rotation of a lever 186 effects directly the operation of a stop bar 127. In the present embodiment, the stop-bars 127 are eleven in number and are thus by means of levers 186 shiftable individually to the right as viewed in Fig. 4 into the path of the pawl 126 for the purpose previously described. A twelfth stop-bar 182′ is provided as shown in Figs. 15 and 17 which is a fixed bar. Thus these twelve stop-bars correspond to the twelve different sizes of matrices used.

*Interchangeable code bar unit*

Figure 23:
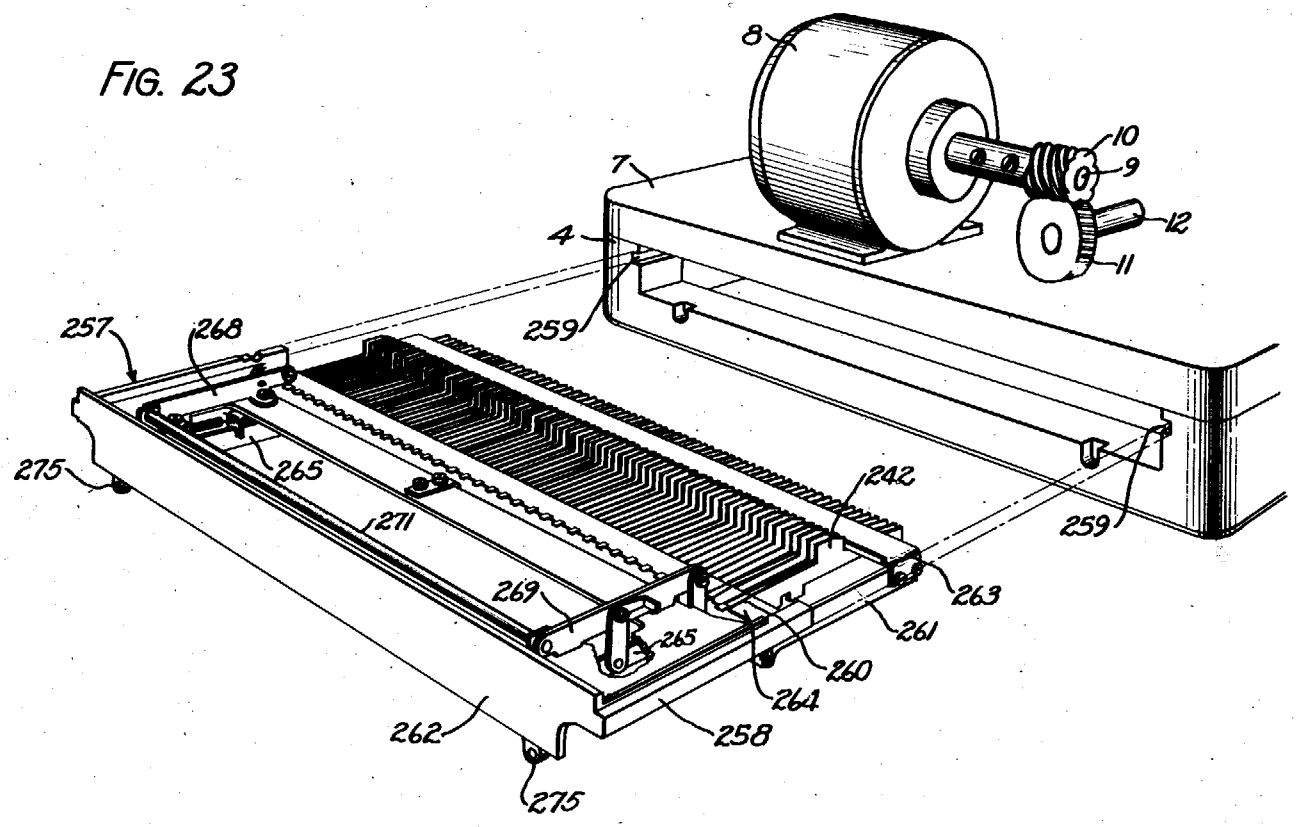
Fig. 23 is a perspective view of the interchangeable code bar unit.

An important feature of this invention is the provision of an interchangeable code bar unit 257 as shown in Fig. 23, whereby it is possible to change the operation of the counter so that the apparatus may be used for matter to be set in different styles of type; for example, Modern Roman, Old Style Roman, Gothic, etc., or to be set in different languages, or in special fonts of type as for example, fonts suitable for mathematical books.

In order to compensate for the varying thicknesses and to obtain an accurate count of the thicknesses of the matrices composing a line it is necessary to provide code bars 242 that are notched to correspond to the particular font. However, that portion of each code bar which controls the selection of the permutation bars 241 corresponding to the punch interference bars, ordinarily remains the same for all fonts since the code combinations are assigned primarily to the particular keys on the keyboard. Ordinarily only that part of the code bar which controls the selection of the counter permutation bars 241 is notched differently for corresponding characters in the different fonts. Thus to promote the substitution of code bars for the various fonts of type, the code bars for each different font have been assembled in an individual unit 257, which comprises a frame 262 provided with runners 258 adapted to slide in corresponding grooves 259 in the frame 4 (Fig. 23).

Figure 24:
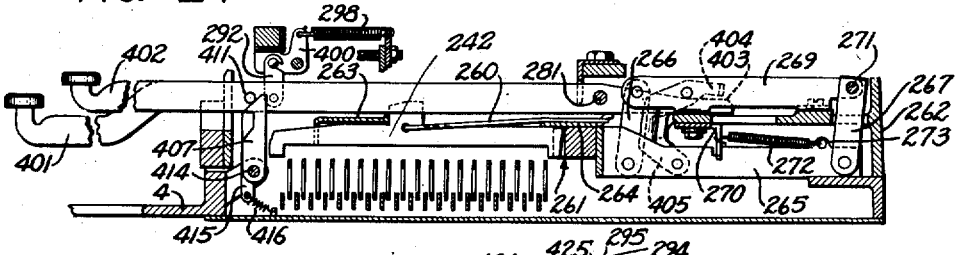
Fig. 24 is a transverse sectional view of the keyboard taken on line 24—24 of Fig. 1 illustrating the shift mechanism.
Figure 31:
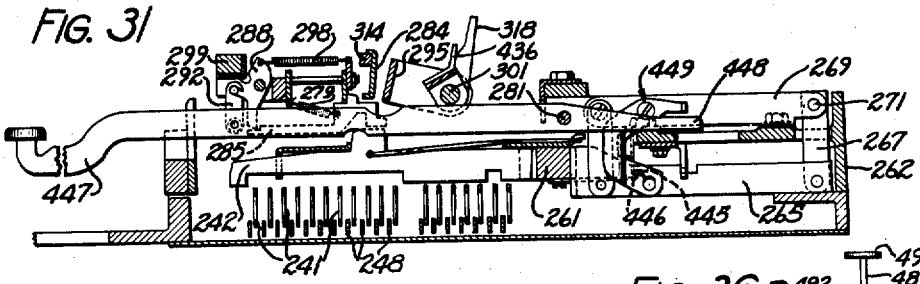
Fig. 31 is a transverse sectional view of the keyboard showing a modified unshift mechanism.

Code bars 242 are self-contained in frame 261, which in turn is shiftably mounted in frame 262, as is more clearly shown in Fig. 24. As indicated in Figs. 23 and 24, the code bars are carried by springs 260, which normally tend to hold the code bars in their upward position against common stops 263 and 264. Frame 261 is provided with a pair of extensions 265 which are pivotally connected to links 266 and 267 (Figs. 24 and 31). Links 267 in turn are pivotally connected to the supports 268 and 269 (Fig. 23) secured to frame 262. Links 266 and 267 are fixed to rock shaft 271 which is suitably journalled in the supports 268 and 269. Parallel motion is thereby permitted between the frames 261 and 262. Attached to lug 273 integral with one of the extensions 265 is one end of spring 272, the other end of which is fixed to spring support 270 mounted on frame 262. The extensions 265 are guided in their to and fro movement in slotted guides in the spring support 270. The code bar frame thus is normally held toward its back position by the spring 272. The code bar unit is provided with lugs 275 whereby it is adapted, when inserted in the frame 4, to be removably attached thereto by means of screws.

The reason for shiftably mounting code bar frame 261 is to effect a change in the counting mechanism dependent upon whether upper or lower case characters are being operated. It is well known that a lower case matrix is frequently different in width than a corresponding upper case character, hence since the same key lever is depressed for the upper case character as for the corresponding lower case character it is necessary to vary the operation of the counting mechanism accordingly. Therefore, when the code bar frame is in its normal back position the notched edge of the code bar is adapted, when the code bar is depressed, to actuate the permutation bar corresponding to the thickness of the lower case matrix and hence the corresponding stop bar 127 is actuated. But when the code bar frame is shifted to its front position, in a manner hereinafter described, the same notched edge will actuate the permutation bar corresponding to the thickness of the capital or upper case matrix and hence a different stop bar 127 will be actuated.

*Seven-unit keyboard arrangement*

The particular keyboard shown in Fig. 1 has been devised to combine those elements which lead to the greatest efficiency. By using a seven-unit code the number of operations made by the operator is less than if a six-unit code is used. With a seven-unit code for controlling composing machines it is possible to have a key for each character so that only one operation is required for each character. However, if this is done, a very large keyboard results, which is much more difficult and expensive to build, especially on account of the length of the code bars, bails, etc. It also results in a keyboard in which the operator must move his hands over a large area and thus lose speed.

However, by providing separate keys for all characters except capital letters, a highly efficient compromise is made. With the shift key mechanism here provided the shift key and character key may be depressed simultaneously; whereas, when a shift signal is used as in telegraphy, a single upper case character requires the successive depression of three keys, namely the "shift" key, then the character key and finally the "unshift" key.

Figure 25:
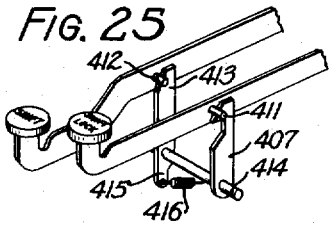
Fig. 25 is a perspective view of the shift lock device.

Thus, in the keyboard arrangement shown in Fig. 1, the shift mechanism indicated in Figs. 24 and 25 is utilized, whereby the shift operation becomes necessary only for the upper case letters or capitals, all other letters (lower case) and characters being produced in the unshift or normal position of the apparatus, thereby greatly enhancing the speed of operation by eliminating the shift signal and special code combination therefor, it being necessary merely to hold the shift or "capitals" key depressed when capital letters are desired as in standard typewriter operation.

*Key operation*

Figure 27:
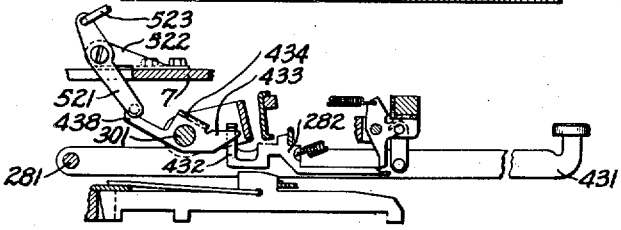
Fig. 27 is a transverse sectional view with some parts eliminated taken on line 27—27 of Fig. 1 adjacent the elevator key lever.
Figure 28:
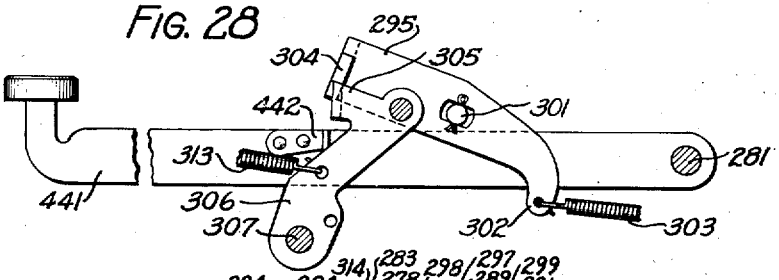
Fig. 28 is a view illustrating the operation of the repeat key lever.
Figure 29:
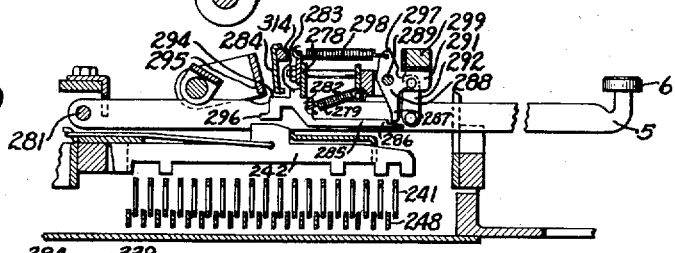
Fig. 29 is a transverse sectional view of the keyboard taken on line 29—29 of Fig. 1, showing the preferred form of key operation.

The following description relates to the key lever system and the operation thereof reference being had to Figs. 24 to 33. All of the key levers are pivotally mounted on the pivot shaft 281 which is suitably mounted in the frame 4. Associated with each key lever 5, as viewed in Fig. 29, is a member 282 provided with a vertical lug 283 adapted normally to abut the stop 278 and also, when in operation, to co-act with release bail 284. Member 282 is also provided with an extension 285 which in turn is provided at its end with a shoulder 286 adapted to cooperate with arm 287 of lever 288 pivoted on common pivot shaft 289. Lug 283 is normally maintained against the stop 278 by the action of spring 279 one end of which is attached to member 282 and the other secured to the common spring support. Lever 288 is also provided with an arm 291 to which is pivotally connected one end of link 292 the other end of which is pivotally connected to key lever 5.

Each member 282 is provided with an operating shoulder 294 which cooperates with operating bail 295, and a foot portion 296 adapted to cooperate with the associated code bar 242. Lever 288 is also provided with an extension 297 to the end of which is attached one end of a spring 298 and the other end of which is secured to the frame 4. Lever 288 normally tends to rotate in a counterclockwise direction (as viewed in Fig. 29) thus maintaining arm 291 against the common stop member 299.

The operating bail 295 (as viewed in Fig. 20) is substantially U-shaped and is fixed to operating bail shaft 301 which is suitably journaled in frame 4. Bail 295 is provided at one end with an extension 302 to the extremity of which is attached one end of the operating spring 303, the other end of which is secured to frame 4. Bail 295 is provided at the same end with a lug 304 which is adapted to cooperate with trip latch 305 (Fig. 22) integral with lever 306 which is pivotally mounted at 307 to frame 4. Pivotally carried by lever 306 is trip lever 308. Lever 308 is provided with an arm 309 which cooperates with lug 311 on bail 284, and is also provided with an arm 312 which through its laterally disposed end cooperates with the extension 302 of bail 295. Lever 308 normally tends to rotate in a clockwise direction (as viewed in Fig. 22) about its pivotal connection to lever 306 due to the action of spring 310, one end of which is attached to lever 308 substantially as shown and the other end to lever 306. Lever 306 in turn normally tends to rotate in a counterclockwise direction about its pivot 307 due to the action of spring 313 one end of which is attached to lever 306, the other end being secured to frame 4.

Bail 284 is positioned adjacent to and in parallel relation with bail 295. In the present embodiment, bail 284 is of U-shaped cross section and is secured longitudinally to the pivot shaft 314 which is suitably journaled in frame 4. Bail 284 is held normally against a stop 315 (Fig. 22) by means of spring 316.

With reference to Fig. 22 a description of the operation of bails 284 and 295 will now be given. As bail 284 is caused to rotate in a counterclockwise direction about pivot shaft 314 upon the depression of a key, as will presently appear, its lug 311 co-acts with arm 309 of lever 308 and during the initial movement the lever 308 is caused to rise slightly due to its slotted hole 317 so that arm 312 will clear bail 295. The further movement of lever 308 by bail 284 will cause lever 306 to rotate in a clockwise direction against the action of spring 313 until latch 305 becomes disengaged from lug 304 thereby permitting the action of spring 303 to take effect, thus causing bail 295 to rock sharply in a downward direction. Upon the downward movement of bail 295, bail 284 is permitted to return to its left-hand position against the stop 315 by means of spring 316.

Bail 295, as previously mentioned, is fixed to rock shaft 301. Likewise fixed to shaft 301 is bail restoration arm 318, Figs. 12 and 20. As shown in Fig. 12, arm 318 is adapted to cooperate with arm 319 of bail restoration lever 321 which is appropriately pivoted at 322 to frame 4. Lever 321 is also provided with arms 323 and 324. Mounted at the extremity of arm 323 is cam follower roller 325, which cooperates with operating bail restoration cam 30 rotatively mounted on shaft 20 as previously described. Arm 324 of lever 321 co-acts with stop lugs 326 and 327 of disc 29 secured to cam 30, as previously mentioned.

Figure 5:
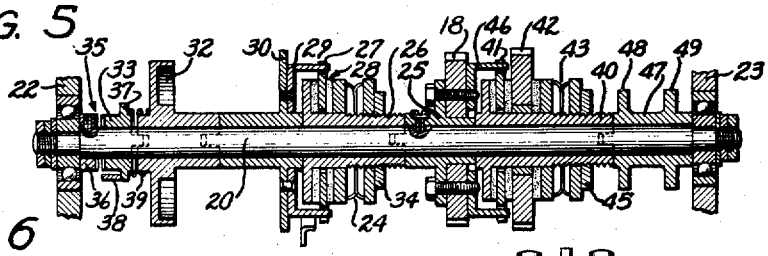
Fig. 5 is a longitudinal sectional view of the operating cam shaft.

As already noted in connection with Fig. 5, lugs 326 and 327 also provide a drive connection between drive disc 27 and cam 30. Lever 321 normally tends to rotate in a counterclockwise direction under the action of spring 328, one end of which is suitably attached to lever 321, the other end being secured to frame 4. As beforementioned, drive disc 27 is adapted to rotate, when released for rotation, by means of its frictional connection to constantly rotating sleeve 26 (Fig. 5). Thus when bail 295 is operated, shaft 301 will likewise revolve a limited amount causing arm 318 (Fig. 12) also to rotate which in turn will impart clockwise rotation to lever 321, thus disengaging arm 324 from lug 327 and releasing cam 30 for rotation, cam follower roller 325 being brought into engagement with cam 30. Now as cam 30 rotates, follower 325 is cammed out and lever 321 thus is caused to rotate in a counterclockwise direction to impart clockwise rotation to arm 318 which through shaft 301 rotates bail 295 (Fig. 22) in a like direction against the action of spring 303, thus permitting lever 306 to respond to the pull of its spring 313 to introduce latch 305 again into the path of lug 304 and reset bail 295 preparatory to a succeeding operation of a key lever. During the resetting operation just described, stop arm 324 (Fig. 12) is introduced into the path of lug 326, thus restricting cam 30 to only one-half revolution for each cycle of operation.

The key operation shown in Fig. 29 will now be described. The depression of key 6 causes keylever 5 to rotate to a limited extent in a clockwise direction about pivot 281 which through link 292 imparts like rotation to lever 288 about its pivot 289 against the action of spring 298. Member 282 thus is caused, through the cooperation of arm 287 of lever 288 and shoulder 286, to slide toward the left on stop member 278, the lug 283 simultaneously engaging the bail 284 and causing it to rotate about its pivot 314, the effect of which is to release bail 295 for operation, as has already been described. Shoulder 294 of member 282, however, before the release of bail 295, has been interposed between bail 295 and code bar 242 corresponding to the key lever depressed. Thus when bail 295 is actuated, member 282 is caused thereby to move downwardly in a substantially horizontal manner, thus urging code bar 242 in the same direction to effect the operation of predetermined ones of permutation bars 241. When member 282 was actuated by bail 295, lug 283 became disengaged from bail 284 and shoulder 286 became disengaged from arm 287, thus permitting bail 284 to return to its normal position under the action of its return spring 316 (Fig. 22), previously mentioned, and also permitting keylever 5 to return to its normal position. When bail 295 is restored to its original position, in the manner hereinbefore described, member 282 is again restored to its original position (shown in Fig. 29) by a spring 279.

Certain special key levers are provided with which special functions may be initiated, and of each of which a description will now be given.

*Shift key arrangement*

In Fig. 24 is illustrated the shift key arrangement. Shift key 401 and shift-lock key 402 are pivotally mounted on the common pivot shaft 281 as heretofore mentioned and are held in their normal inoperative or clockwise position by the action of one of the springs 298 upon lever 480 and a link 292 similar to the manner previously described. Key levers 401 and 402 are each provided with a rearward extension 403 adapted to cooperate with arm 404 of shift link 405, which link is pivotally secured to members 269 and 265 such as to preserve the parallel motion effect between the fixed supports 268 and 269 (Fig. 23) and the code bar frame 261.

To maintain code bar frame 261 in its normal left hand position (as viewed in Fig. 24) a spring 272, as previously stated, is provided, one end of which is attached to extension 273 and the other end is secured to the frame 262 at 270. Thus it is observed that when one of the keys 401 and 402 is depressed or caused to rotate slightly in a counterclockwise direction like rotation is imparted to link 405 through extension 403 and arm 404. Code bar frame 261 in this manner is shifted toward the right against the action of spring 272 in which position the code bars are adapted to effect the counting of upper case letters, as previously described. Code bar frame 261 is adapted, when key lever 401 is released, to return to its normal position.

However, when key lever 402 is operated code bar frame 261 is actuated to the right the same as in the case of key lever 401 except that frame 261 is adapted to be locked in the shifted position, by means of hook member 407, Figs. 24 and 25, in the following manner. Key levers 401 and 402 are provided with studs 411 and 412 adapted to co-act with the bevelled upper ends of hook member 407 and release member 413, respectively, which members are adapted to be fixed to rock shaft 414 suitably journalled in frame 4. Member 413 is provided with an extension 415 to which is attached one end of spring 416, the other end of which is secured to frame 4. Spring 416 thus normally tends to hold members 407 and 413 against the studs 411 and 412. When shift-lock key lever 402 is depressed, arm 407 is cammed out until pin or stud 411 engages the hook portion thereof, lever 402 thus being held or locked in the shift position until released by the subsequent operation of lever 401 which when operated causes member 413 to rotate in a clockwise sense, which through rock shaft 414 imparts like rotation to member 407 thus releasing stud 411 and permitting lever 402 to return to its normal position.

In the use of this form of shift mechanism no perforated record is made when a shift key is operated, the function of the shift mechanism being to maintain the code bars 242 in the shifted position while the perforated record is being made of the upper case characters. In other words, the depression of the shift key does not initiate the operation of the apparatus to effect either the perforating or counting operations, as is done upon the operation of the remaining keys.

*Space-key arrangement*

Figure 26:
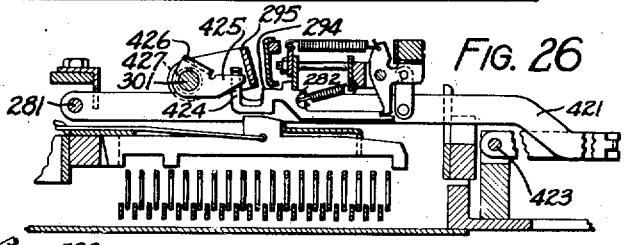
Fig. 26 is a transverse sectional view of the keyboard adjacent the space key lever.

The space-key arrangement is shown in Fig. 26. The space-key lever 421 is pivotally mounted on common pivot shaft 281. Having reference to Fig. 1, it is noted that key-lever 421 is operated by space-bar 422 by obvious means through rock shaft 423. Member 282 associated with key-lever 421 is provided with an extension 424 which cooperates with arm 425 of bail 426 for operating the space-band counting mechanism. Bail 426 is loosely mounted on the operating bail shaft 301 as clearly indicated in Fig. 20, and normally tends to rotate in a counterclockwise direction (as viewed in Fig. 26) by means of a coil spring 427 surrounding shaft 301. Bail 426 is also provided with a trip-arm 428 (see Figs. 7 and 20) adapted to cooperate with trip-lever 429 (Fig. 7) as will presently appear.

Now, when space-key lever 421 is operated, the special member 282 is actuated in the manner hereinbefore described thus presenting its ledge 294 beneath operating bail 295 and upon operation of bail 295 member 282 is urged downwardly, extension 424 engaging arm 425 and causing bail 426 to rotate in a clockwise direction against the action of spring 427, thus imparting counterclockwise rotation to trip lever 429 (Fig. 7) to effect the operation of the space-band counting mechanism as will hereinafter appear.

*Elevator key*

The elevator key arrangement is shown in Fig. 27. The elevator key is analogous to the well known carriage return key employed on printing telegraph keyboards and its function in the present apparatus is to produce a perforation in the tape and simultaneously to initiate the restoration of the counter and indicator to the beginning-of-line position. It derives the name "elevator" key from the fact that the corresponding perforation in the tape controls the operation of the assembly elevator in the typecasting machine.

Elevator key lever 431 is pivotally mounted on the pivot shaft 281, and special member 282 associated with key lever 431 is provided with an extension 432 similar to extension 424 previously described in the case of the space key. Extension 432 is adapted to cooperate with arm 433 of bail 434 in a manner similar to that described in connection with bail 426. Bail 434, like bail 426, is loosely mounted on shaft 301 and is actuated by coil spring 435 in the same manner as is bail 426 by spring 427. There is provided on bail 434 a trip-arm 436 (Figs. 12 and 20) which cooperates with trip lever 437 (Fig. 12). Bail 434 is further provided with an arm 438 adapted to coact with the line counter 430 (Fig. 1) as will presently appear.

The operation of this key lever arrangement is similar to that described in connection with the space key, thus, when key lever 431 is operated, special member 282 is actuated in the hereinbefore described manner to present its ledge 299 beneath operating bail 295 and upon the operation of bail 295 member 282 is urged downwardly, the extension 432 engaging arm 433, thus causing bail 434 to rotate in a clockwise direction against the action of spring 435, thus imparting, through the medium of trip-arm 436, clockwise rotation to trip lever 437 (as viewed in Fig. 12) to initiate the operation of the counting and spacing mechanisms simultaneously to effect the restoration of the apparatus to the initial or beginning-of-line position.

Thus when the elevator key is depressed, bail 434 is operated and lever 437 is caused to rotate against the action of spring 458 about its pivot 439, and end 440 of lever 437 becomes disengaged from stop disc 48 thus permitting member 47 to rotate one complete revolution due to its frictional relationship with gear 18 (Figs. 1 and 5). Cam portion 49 of member 47 thereby co-acts with follower roller 443 mounted on lever 444 to cause lever 444 fixed to rock shaft 450 to rotate against the action of spring 420. Thus cam 49 during a complete revolution imparts a rocking motion to shaft 450, the effect of which is to hold pawl 125 disengaged from the counting wheel 113 and to hold pawl 462 on escapement lever 463 from ratchet 82 during the restoration operation (Figs. 7, 12 and 14).

Escapement lever 463 is pivoted at 466 and its oscillation is limited by stop pin 467. Lever 463 is normally held to the right (as viewed in Fig. 7) by spring 468. The function of lever 463 is to effect the return of chart 88 to its initial or beginning-of-line position. Pivotally articulated to lever 463 is one end of pull bar 469, the other end of which is pivotally connected to lever 470 fixed to rock shaft 450 (Fig. 1). Thus, when the rock shaft 450 is actuated as previously set forth, lever 470 effects through bar 469 the oscillation of lever 463 to the left (Fig. 7) against the action of spring 468. As is apparent from the conformation of cam 49 (Fig. 12) lever 463 is held in its left hand position (Fig. 7) substantially for one complete revolution of said cam.

The effect of thus holding lever 463 in its left hand position is to disengage entirely the escapement pawl 462 from the ratchet 82 and simultaneously introduce the laterally disposed end of arm 87 into the path of either of the lugs 85 or 86 of disc 84. As set forth in the aforementioned patent, the chart 88 has two similar halves, each half comprising an equal number of scales, so that only one-half revolution of the chart is necessary to restore it to a beginning-of-line position. The diametrically disposed lugs 85 and 86 thus correspond to the two initial positions of the chart 88. It is apparent, therefore, that the ratchet 82, and hence the cylindrical chart 88, is free to rotate until the nearest tooth 85 or 86 is intercepted by the arm 87, at which point the chart 88 will assume its beginning-of-line position. At the completion of the revolution of cam 49 the follower 443 again engages the depression in said cam and permits lever 463 to be biased to the right (Fig. 7) by spring 468 bringing pawl 462 again into engagement with ratchet 82 preparatory to beginning a succeeding line.

As previously mentioned, the spaceband and matrix counting mechanism are restored simultaneously to the beginning-of-line position. Having noted the manner in which the spaceband counting mechanism, including chart 88, has been restored, a description of the manner in which the matrix counting mechanism is restored will now be given. The manner of rocking the shaft 450 and its effect on the spacing mechanism has been observed. The rocking motion of shaft 450 is simultaneously made likewise effective in oscillating lever 472 (Fig. 12), also fixed to shaft 450. Thus, when lever 470 is actuated to effect the release of pawl 462 from ratchet 82, the lever 472 is similarly effective to disengage lever 123 from unit wheel 113 through the medium of release bar 133, which bar is articulated to lever 128 and pivotally connected to lever 472.

The unit wheel is thereby permitted to rotate freely until the shutter or index member 89 has been restored to the beginning-of-line position, which is determined by the coaction of stop lug 166 with stop arm 168 of lever 169, at which time the cam 49 will have made a complete revolution and follower 443 will have again engaged the depression therein, thus allowing the lever 128 to again engage the counting wheel 113. The function of stop lug 166 will now become apparent. Referring to Figs. 4 and 12 it will be noted that when arm 168 is engaged with lug 166, follower roller 177 will rest in the notch or depression in cam 71, in which condition shutter 89 will be held at its beginning-of-line position. Now, upon the depression of the first character key in the line to be perforated and totalized, the lever 141, shown in Fig. 15, will be operated by cam 32, as previously described, to permit unit wheel 113 to rotate an amount determined by the stop bar 127 selected. It will be noted further that pin or stud 175 at one extremity of lever 141, will, upon actuation of lever 141, cam arm 174 of lever 139 outwardly sufficiently to disengage arm 168 from lug 166. In this manner, that is, upon the depression of a character key, lug 166 is caused to escape arm 168 each time lug 166 passes said arm 168 during the performance of the counting operations, since it is manifest from a study of Figs. 1 and 4, that there is a gear ratio of approximately 4 to 1 between gears 70 and 114 (and consequently between gears 91 and 117) and hence shaft 111 carrying unit wheel 113 and gears 114 and 117 will make four complete revolutions while the cam 71, gears 70 and 91, and shutter 89 make one revolution. After the first counting operation, the movement imparted by unit wheel 113 through gear 114 to gear 70 and cam 71 will cause follower roller 177 to be cammed out and thereafter, until cam 71 and shutter 89 have made one complete revolution, roller 177 will ride or dwell on the outer periphery of cam 71, thereby maintaining arm 168 clear of lug 166. It is evident that each time the lug 166 reaches the arm 168 during the operation of the device in response to depression of character keys that the camming action aforesaid between pin 175 and arm 174 will cause arm 168 to escape lug 166. In continuous operation when unit wheel 113 has made four revolutions, the shutter 89 and gear 71 will have made one revolution; thus it is manifest that should the end-of-line key be depressed at any time after the depression of the first character key for the beginning of a new line, the unit wheel will have to make the necessary number of revolutions not exceeding four in order to return the shutter 89 and cam 71 to their beginning-of-line position. To accomplish this result, the purpose of the short depression and the complementary long dwell in cam 71 is apparent since with this arrangement arm 168 is projected into the path of lug 166 only at the beginning-of-line position of the cam 71 and shutter 89. Cam 71 thus controls the number of revolutions unit wheel 113 makes after the end of line is reached to restore the shutter to its zero or beginning-of-line position.

*Repeat key*

The repeat-key arrangement is shown in Fig. 28. Repeat-key lever 441 is pivotally mounted on pivot shaft 281 in juxtaposition with the aforementioned lever 306 so that member 442 secured to lever 441 is adapted to engage lever 306 such that when the key lever 441 is operated; that is, depressed, member 442 will engage lever 306 and cause the lever 306 to be rotated in a clockwise direction about its pivot 307 against the action of spring 313 to effect the disengagement of arm 305 from lug 304. This disengagement, as previously noted, permits bail 295 to operate due to the pull of spring 303. Normally, as has already been seen, when bail 295 is restored to its original position, arm 305 of lever 306, because of the action of spring 313, re-engages lug 304. However, as long as key lever 441 is held depressed, lever 306 will be held in its clockwise position maintaining arm 305 out of disengagement with lug 304, and bail 295 will be permitted to rock continuously and thus repeat the perforating and counting operations in accordance with the simultaneously depressed character key. Bail 295 thus will continue to operate until key lever 441 is released and arm 305 thereby allowed again to engage lug 304.

The repeat-key is used, for example, to fill out a line with quads, to connect a title and figure in tabular work by a dotted line, or to make a line of dashes. It will be evident that in certain classes of work such a key will materially increase the output of the operator.

*Spaceband counting mechanism*

The mechanism shown in Fig. 7 is the spaceband counting mechanism, the function of which is to control the rotation of chart 88. It has been observed that when space key 422 (Fig. 1 and Fig. 26) is depressed the operation of bail 426 is effected causing trip-arm 428 to co-act with trip-lever 429 (Fig. 7). Lever 429 thus is caused to rotate in a counterclockwise direction about its pivot 461 to impart a clockwise rotation to escapement pawl 462 pivotally connected to escapement lever 463, thus permitting ratchet 82 to rotate or "escape" one-half step due to the frictional relationship between ratchet 82 and the driving mechanism as described in connection with Fig. 6.

When the key lever mechanism is restored to normal the effect of lever 429 upon pawl 462 is removed, thereby permitting pawl 462 to return to its left hand position against stop 464, due to the action of spring 465, one end of which is attached to pawl 462 and the other end to lever 463. Ratchet 82 then is allowed to rotate another one-half step in usual escapement fashion, the movement of ratchet 82 thus being effected in step-by-step manner as set forth. The movement of ratchet wheel 82 one step corresponds to one more spaceband in the line and results in the display of the next scale on chart 88 showing the new limits of automatic justification.

*Totalizer reversing mechanism*

As previously mentioned, provision is made by means of back-space lever 235 (Figs. 1, 16 and 17) for moving the tape back for correction of errors. The customary method of making a correction, or rubbing out a wrong letter, as is commonly known, consists in back spacing the tape so that the set of perforations desired to be rubbed out are presented in front of the punches, whereupon the "Rubout" key (Fig. 1) is operated, the effect of which is to force all of the punches through the tape, which new code combination will have no effect upon the composing or type casting machine and thus no evidence of the correction appears in said machine. However, in the prior devices no provision has been made to correct or revise the count shown by the totalizer or indicating device. In the present device a novel subduction means has been provided for subtracting the thickness of the matrices of the rubbed out or deleted characters, which mechanism is clearly shown in Figs. 34, 35, 36 and 36*a*. Moreover, a means has also been provided for disabling the perforation selector bars during the subtracting operation, whereby every perforating key becomes a "Rubout" or deleting key.

Referring to Fig. 34, it is observed that in the event the totalizer reversing mechanism is added to the apparatus herein described, the indicating device will merely be altered to the extent of extending shaft 21 and shifting the location of the indicators to permit the reversing mechanism to be introduced between gears 70 and 91. Essentially, the reversing means comprises a differential mechanism mounted on the counting wheel shaft 111. Juxtapositioned to pinion 114 and likewise fixed to shaft 111 is bevel gear 473. Freely mounted on shaft 111 and adjacent to gear 473 is brake wheel 474. Also freely mounted on shaft 111 adjacent to wheel 474, but oppositely disposed to gear 473, is the mechanism more clearly shown in section in Fig. 35, which comprises a sleeve member 475, a bevel gear 476 fixedly mounted on said sleeve, and a collar 477 splined to the hub of gear 476 and adapted to slide longitudinally on member 475. Collar 477 is provided integrally thereto with a pinion 478 and flange 479. Between gear 476 and pinion 478 is interposed a helical spring 481, the distending action of which normally tends to hold collar 477 against the bearing 482. There is interposed between pinion 478 and flange 479 the arm 483 of a release lever similar to lever 119 previously mentioned. Pinion 478 is adapted to mesh with gear 91 of shutter 89 in a manner similar to pinion 117 previously described.

Figure 36:
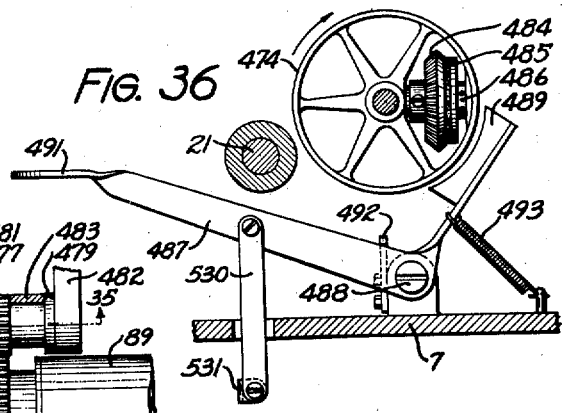

Bevel gear 484 is rotatably carried in brake wheel 474 and is adapted to mesh simultaneously with gears 473 and 476. As shown in Fig. 36, the rotative movement of gear 484 is adapted to be restrained by the friction element 485, the pressure of which is controllable through nut 486. Thus, frictional resistance is imparted to gear 484 sufficient to overcome the resistance of chart 89 and the interconnected parts when the counting mechanism is operating normally.

Cooperatively associated with brake wheel 474 is the brake shoe lever 487 pivotally mounted at 488 on frame 7, which lever is provided with brake shoe 489 and thumb portion 491 and is normally held in a clockwise position (as viewed in Fig. 36) against stop 492 by spring 493. If desired the co-acting surfaces of the brake wheel and shoe may be provided with numerous fine teeth or serrations to improve the gripping qualities thereof.

It is necessary when operating the reversing mechanism to change the operation of the perforation selector bars. To accomplish this the following mechanism is provided. Referring to Figs. 36 and 36*a*, there is pivotally connected to lever 487 and depending therefrom link 530, the lower end of which is pivotally connected to one end of lever 531 which in turn is pivoted at 532 and co-acts with lever 533 pivotally mounted at 534. Lever 533 cooperates with bell crank 535 mounted on shaft 254 adjacent to levers 185. Fixed to bell crank 535 is the stud 536 adapted to span levers 185 so that when bell crank 535 is actuated in a clockwise direction (as viewed in Fig. 36*a*) upon the operation of lever 487, all of the levers 185 will be simultaneously rotated in the same direction about pivot shaft 254 to rotate levers 202 (Fig. 17) in the opposite direction to thereby bring interference bars 201 into operative relation with the punches 213. The perforating punches will thus be held in this operative condition so long as lever 487 is held depressed, and the permutation bars 241 will have no effect on the perforating mechanism while the reversing operation proceeds.

The operation of the totalizer reversing mechanism will now be described. When the counting or totalizing mechanism is operated normally the gears 473, 476 and 484 and wheel 474 will rotate as a unit, the gear 484 being constrained against rotation by friction element 485 will form a rigid connection between 473 and 476 and, hence, gears 473 and 476 will rotate in a like direction, thus imparting to gear 91 and shutter 89 rotation in the normal direction. When it is desired to employ the reversing mechanism brake lever 487 is manually operated or depressed and held in its counterclockwise position (as viewed in Fig. 36) to prevent the turning of wheel 474 during the entire reversing operation. As long as lever 487 is held so depressed levers 185 will be held against operation by stud 536 of bell crank 535, as previously described. While wheel 474 is so held the keys corresponding to the deleted or corrected matter are again operated, thus operating counting wheel 113 in the usual manner. However, while wheel 474 is seized, gear 484 will be constrained to rotate with gear 473 and thus impart rotation to gear 476. In this event, the direction of rotation of gear 476 will be opposite to that of gear 473 and hence the rotation of gear 91 and shutter 89 will be the reverse of their normal rotation. Thus, it is obvious that although the counting wheel 113 is operated in the usual manner the indicating device will be operated in the opposite manner.

A brief description of the manner of performing the totalizer reversing function will now be given. Assuming as an example that the code combinations for the word "and" were perforated in the tape when it was intended to perforate "are," the procedure would be as follows. The tape would be back spaced three steps in the present example, corresponding to the three letters in the word to be deleted. The lever 487 then will be operated, the effect of which is to prevent wheel 474 from rotating and to render levers 185 inoperative, as described above. While the lever 487 is still held depressed the keys corresponding to the deleted word (in this instance, the word "and") are again operated, the effect of which will be to operate the indicator in a reverse direction, thereby placing the indicator in the same position as it was before the wrong word was perforated. At the same time, the perforating mechanism will be operated the same as before upon the depression of a key, except that all of the interference bars 201 will be held beneath the punches thereby causing all of the punches to be forced through the tape each time a key is depressed, thus automatically producing the perforation of the "Rubout" combination for each key during the subtracting operation. The lever 487 is thereupon released and the apparatus is thus restored to its condition for normal operation and the code combinations of the word "are" are perforated in the tape (according to its code combinations) in the usual manner.

*Automatic tape winder*

Prior devices have employed tape winding apparatus operated and positioned independently of the perforating apparatus, which tape winders are actuated by a clock spring or in some similar manner. These winders are objectionable because they have a tendency to pull the tape beyond the breaking point, and also they require the constant attention of winding and positioning. In the present device a novel tape winder has been provided which forms a part of the perforating apparatus and is also actuated automatically thereby.

The tape winding device of the present invention is shown in Figs. 1, 2 and 3 and comprises essentially a pair of discs 494 and 495 maintained in spaced relation by four posts 496, one of which is provided with a longitudinal slit therethrough into which the end of the tape is insertable preparatory to winding. The tape reel is suitably mounted by means of a stud 497 to a bracket 498 secured to the frame 7 of the apparatus. Ratchet 499 is mounted on stud 497 exteriorly of the tape reel and is adjacent to disc 495 being also secured thereto. Pivoted to disc 495 (Fig. 2) and appropriately positioned thereon for cooperative relation with ratchet 499 is tape reel lever 221, previously alluded to, having an arm 501 which co-acts with tape feed lever 217 (Fig. 18). Arm 502 of lever 221 has pivotally connected to its extremity a pawl 503 adapted to be held in cooperative relation with ratchet 499 by spring 504. Pivotally connected to pawl 503 opposite to spring 504 is tape guide rod 505 which is adapted to be threaded through a pair of lugs on arm 501 of lever 221, and which is also provided with a tape engaging arm 506.

A description of the operation of the automatic tape winder of this invention will now be given. As previously noted, the sharp, staccato movement of tape feed lever 217 imparts like motion to lever 221 which motion is imparted in turn to pawl 503. Pawl 503 thus is urged sharply to the right (Fig. 2) and due to its engagement with ratchet 499 this ratchet tends to rotate in a counterclockwise direction thereby taking up the slackness in the tape. Provision has also been made to prevent the accidental breaking of the taut tape by means of tape guide rod 505. The instant the tape becomes taut, tape guide rod 505 is lifted by the tape, thus causing pawl 503 to rotate about its pivot 500 to effect its disengagement from ratchet 499. Thus, it is apparent that pawl 503 becomes automatically disengaged from the ratchet the instant the slack of the tape is taken up, thus precluding the possibility of extending or tensioning the tape beyond its breaking point.

*Line counter*

It is desirable that the operator in the preparation of perforated tape for use in composing machines be apprised of the number of lines of type of printed matter he has prepared in tape. This is important in order that the reels of tape may be of the same size, and also to apprise the operator that enough perforated tape has been prepared to provide a sufficient number of slugs or lines of type to fill the galley. It is especially important in magazine work where the illustration cuts into the printed matter, in which event the operator is usually given written instructions as to how long to make each line in order to avoid the illustration. In the present invention automatic means has been provided whereby the operator will be informed at all times of the number of lines he has prepared. Referring to Fig. 27, bail 434 is provided with an arm 438 which, as previously mentioned, is adapted to control the operation of the line counter. Appropriately positioned for cooperative relation with arm 438 is lever 521 which is pivoted to a suitable bracket 522 secured to cap member 7. One arm of lever 521 co-acts with arm 438 and the other arm of lever 521 is pivotally articulated to one end of connecting rod 523, the other end of which is pivotally connected to lever 524 (Fig. 1) of the counting device 430 which may be of any of the well known standard makes. Counter 430 preferably is adapted to be mounted on a suitable bracket 525 adjacent to the indicating device. When bail 434 is actuated by the operation of key lever 431, as previously described, arm 438 rotates in a clockwise direction (as viewed in Fig. 27) which thereby imparts counterclockwise rotation to lever 521, thus causing rod 523 to be pulled to the left to actuate lever 524 (Fig. 1) mounted on the operating shaft of the counter 430 to operate the indicators therein in well known manner. Thus, it is clear that every time the elevator or end-of-line key is operated, a record thereof is made in the counter 430. As is usual, the counter 430 is provided with a lever 526, the function of which, when actuated, is to restore the indicators in the counter to their zero position.

*Modified keyboard arrangement*

The description thus far given has pertained to the preferred embodiment of the invention, which is particularly adaptable to the production of tape perforated in accordance with a seven-unit code. The present apparatus can also be adapted to perforate according to a six-unit code, wherein both the shift and unshift operations are utilized, the key arrangement for which is shown in Fig. 33.

Figure 32:
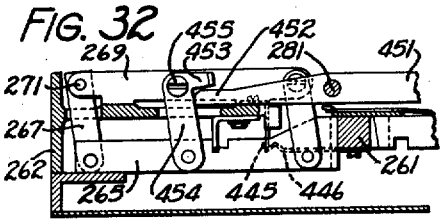
Fig. 32 is a partial transverse sectional view of the keyboard showing the shift mechanism employed with the mechanism shown in Fig. 31.

When a six unit code is employed, a shifting mechanism different from that previously described is used. As is well known, special code combinations are assigned to the shift and unshift operations whereby upon operation of the shift and unshift keys, known as "figures" and "letters" keys, respectively, not only will a change in the shifting mechanism occur but a perforating operation will be effected whereupon a code combination corresponding to the particular shift key operated will be perforated in the tape, to be used later to send a corresponding telegraph signal or to operate a shift mechanism in an automatic type casting unit controlled by perforated tape as described in U. S. Patent No. 1,970,566, granted to E. E. Kleinschmidt. In the case of a six unit code a "figures" shift mechanism (Fig. 31) and a "letters" shift mechanism (Fig. 32) are provided. The "letters" shift mechanism as shown in Fig. 32, is substantially the same as the shift mechanism shown in Fig. 24, except that in the mechanism shown in Fig. 32, spring 272 and shift lock 407 with its associated parts have been eliminated and in its stead a detent member 445 and detent spring 446 have been provided. Thus when the "letters" key lever 451 is operated or depressed, its extension 452 co-acts with unshift member 454 in a manner similar to member 405 (Fig. 24) to effect the shifting of the code bar frame 261, but in this event frame 261 remains in the shifted position and is there held by detent member 445 and spring 446 until caused to be moved to its shift or "figures" position as will presently appear.

As previously observed, the operation of the shift-key lever 401 merely effects the shifting of the code bars and does not initiate the operation of the apparatus or in any other way affect the apparatus. In the present instance, however, the "letters" key lever 451 and the "figures" key lever 447 are each adapted to shift the code bars to their respective shift positions and simultaneously to initiate the operation of the apparatus. Thus, assuming that code bar frame 261 is in the unshift or "letters" position as shown in Fig. 32 and it is desired to actuate the code bar unit to its shift position (Fig. 31), the "figures" key lever 447 is depressed and caused to rotate about common pivot 281 so that extension 448 of lever 447 co-acts with arm 453 of shift lever 449 to rotate lever 449 in a counterclockwise direction (as viewed in Fig. 31) about its pivot 455 thus urging code bar frame 261 to the right such that detent member 445 engages detent spring 446 on the opposite side, or right-hand side as viewed in Fig. 31.

Fig. 33 illustrates an arrangement of keyboard employing the shift and unshift arrangements just described, the "letters" key 451 and "figures" key 447 being indicated as shown. Space bar 422 appears at the foremost part of the keyboard in the usual manner. As is well known, keyboards of this type are commonly employed for telegraph use in connection with apparatus operated in accordance with a five or a six unit code in which two characters are allotted to each code symbol, each of the two characters being distinguished from each other by the "letters" or "figures" code symbol last produced on the preceding part of the tape.

*Modified key operation*

Figure 30:
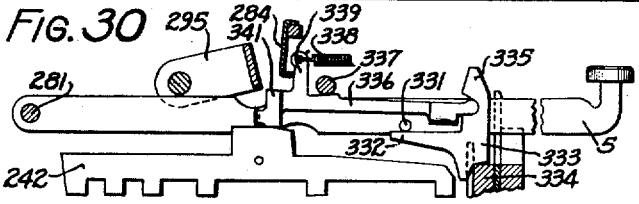
Fig. 30 is a view illustrating a modified form of key operation.

A modified key operation is shown in Fig. 30, of which a brief description will now be given. As indicated, key lever 5 is provided with a stud 331 which cooperates with the horizontal extension 332 of member 333, which member is provided with a heel portion pivotally supported on supporting member 334 in frame 4. Member 333 is also provided with a vertical extension 335 to which is pivotally articulated the interference member 336, which member 336 is adapted to be contiguous to and slidable along key lever 5. Member 336 is in slidable engagement with stop member 337 and is constantly held thereagainst by spring 338, one end of which is attached to vertical arm 339 of member 336, the other end being secured to the frame. Arm 339 cooperates with bail 284 in a manner similar to lug 283 (Fig. 29), previously described. Member 336 is also provided with a shoulder portion 341 which is introduced between bail 295 and code bar 242 to effect the operation of code bar 242.

The operation of the key lever system embodied in Fig. 30 is as follows. Upon the depression of key lever 5, the stud 331 thereon cooperates with extension 332 to cause member 333 to rotate about its pivotal connection with support 334 in a counterclockwise sense, thus urging member 336 to the left so that bail 284 is actuated and shoulder 341 is interposed between bail 295 and code bar 242. The actuation of bail 284 effects the operation of bail 295, as previously described, and thus effects the depression of code bar 242 and predetermined ones of permutation bars 241, as already noted. Upon release of key lever 5 and after the operation of bail 295, the key lever 5 is returned to its normal position by the action of spring 338.

*Magnetic perforator*

A modification of the present invention is shown in Figs. 37 to 40, inclusive, in which a magnetic perforator is utilized instead of the mechanical perforating device shown in Figs. 16 and 17. The magnetic perforator is readily adaptable and easily applicable to the present apparatus merely by securing the punch interference bars 507 of the magnetic perforator to levers 186 (which may be of the same original design or of different conformation) and mounting a perforator magnet contact 508 and a control cam 509 therefor in the device.

Thus, permutation bars 241 will operate levers 186 in the usual manner to operate selectively the bars 507 to position the selected ones beneath the punch pins 519. The shaft 20 will then be caused to rotate one-half revolution as previously described, thus permitting control cam 509 to effect the closing of contact 508 momentarily, thus energizing magnet 511. Energization of the magnet rocks armature 512 clockwise about its pivot 510 (Fig. 37) forcing bars 507 upwardly against the punch pins 519 to perforate the tape. Simultaneously with the perforating operation, pawl 513 will move up to engage the next tooth on ratchet 514. When the magnet is de-energized, spring 515 draws the pawl down, rotating the ratchet one step and feeding the tape to position it for the next perforating operation. In this manner the tape is perforated in accordance with the operation of key levers 5.

In Fig. 40 is shown a diagram of the electric circuit for controlling the perforating control magnet. Thus, when contact 508 is closed an energizing circuit for magnet 511 is completed from positive battery, through winding of magnet 511, thence over conductor 516, through contact 508, over conductor 517 to ground. The condenser 518 with resistance is introduced in the circuit to prevent the sparking of contact 508.

From the foregoing description it is observed that a keyboard perforating and counting apparatus has been provided which has a broad application in the composing and printing art by virtue of its use in connection with any style or font of type, a feature not found in any of the prior devices of this class.

It is understood that this invention may be embodied in other specific forms without departing from the spirit or essential characteristics thereof. The present embodiment is therefore to be deemed illustrative and not restrictive, the scope of the invention being indicated by the appended claims rather than by the foregoing description, and all changes which come within the means and range of equivalency of the claims are therefore intended to be embraced therein.

What is claimed is:

1. In a keyboard device having a plurality of character keys, a chart, an indicating member for co-operating with said chart, a single unit wheel, means for variably operating said unit wheel in accordance with the key depressed to move the indicating means various amounts with respect to said charts, and seignal means dually operated by said chart and said indicating means to apprise the operator of the approach of a predetermined condition.

2. In combination with a keyboard comprising a plurality of keys, a scale, an index member, means controlled by said keys for controlling the movement of said scale and index member, and signal means dually operated by said scale and said index member to indicate the approach of the end of a line.

3. In a keyboard, a scale member, an index member, a series of keys corresponding to a series of characters, a justifying key, means controlled by a character key to move one of said members, means controlled by the justifying key to move the scale member, and signal means dually operated by said members.

4. In an apparatus for producing perforated strips to control composing machines utilizing different fonts of type, a perforating device, a counting device, selector mechanisms individual to each of said devices, and a unit set of code bars corresponding to each font of types, said code bar units adapted to be interchangeably insertable in the apparatus to selectively control the operation of said selector mechanisms simultaneously according to the predetermined font of type to be used.

5. In a keyboard perforator, a perforating device, a counting device, means comprising a single unit wheel adapted to variably control the operation of said counting device, selector mechanisms individual to each of said devices, a series of key-levers, a corresponding series of code elements, each of said code elements adapted to be actuated by its corresponding key-lever to selectively operate said selector mechanisms and simultaneously to control the function of said devices and said means in accordance with the key depressed.

6. In a keyboard device, two groups of character keys, one group comprising solely the upper case letter characters, the other group embracing other characters, a shift key, a counting mechanism, means to operate the counting mechanism according to the key depressed, and means controlled by the shift key effective solely to cause the counting mechanism to operate differently upon the depression of the same letters key subsequent to the operation of the shift key.

7. In combination with a keyboard perforator suitable for the production of perforated tape representing justifiable lines of matrices, a scale member operable variably to show the amount of justification possible in the line at any time, an index member operable variably to show the totalized width of matrices in the line at any time, and signal means dually operated by and members to apprise the operator of the approach of the end of a line.

8. In a tape perforator, punching mechanism, tape receiving means, means including a feed pawl operated by said punch mechanism to control the operation of said receiving mechanism, and a mechanical element in contactual engagement with the tape to disable said feed pawl under certain predetermined conditions to annul the effect of said first mentioned means.

9. In a tape perforator, punching mechanism, tape receiving means, automatic means including a pawl member operated by said punch mechanism to impart rotative motion to said receiving means, and a mechanical element in contactual engagement with the tape and controlled by the tautness thereof to disable said pawl member to check said motion.

10. In a keyboard perforator, means for making perforations in a tape to represent successive lines made up of characters of different widths, means for totalizing the thicknesses of the characters in a line, means for deleting said characters, and subduction means adapted to affect said totalizing means to correspond to said deletion.

11. In a keyboard perforator, a series of keys, means for making perforations in a tape to represent successive lines made up of characters of different widths, means for totalizing the thicknesses of the characters in a line, selector mechanisms individual to each of said means, code members individual to each key, each of said code members adapted to be actuated by its corresponding key to selectively operate simultaneously said selector mechanisms in accordance with the key depressed.

12. In a keyboard perforator, a perforating device, a counting device comprising means to totalize variable additive amounts and to indicate continuously such totalization, a series of key-levers, each operable to effectuate the operation of said devices simultaneously, and means effective to restore said keyboard to normal for a consecutive operation prior to the completion of the operation of said devices to provide an overlap in said perforator.

13. In a keyboard perforator, a plurality of selector mechanisms, a series of key levers, and a code bar unit detachably and removably interposable between said mechanisms and said key-levers, said unit comprising a plurality of code members, one individual to each keylever, each of said code members adapted to be actuated by its corresponding keylever to operate selectively and simultaneously said selector mechanisms in accordance with the key depressed.

14. In a keyboard device, a series of keylevers, mechanisms adapted to be controlled by said keylevers, a floating element associated with each keylever, and means operative by said keylevers to actuate their respective elements to initiate the ensuing operations of said mechanisms.

15. In a keyboard device, a series of keylevers, mechanisms adapted to be controlled by said key-levers, a floating element associated with each keylever, means individual to and operative by each keylever to actuate their respective elements to initiate invariably the operation of certain of said mechanisms, and further means carried by certain of said elements whereby the operation of some other of said mechanisms is simultaneously initiated.

16. In combination with a keyboard device for producing perforated strips to control composing machines utilizing different fonts of type, a plurality of keys, selecting mechanism operable in accordance with the operation of said keys comprising a detachable and removable code bar unit corresponding to each font of type, indicating mechanism comprising a detachable and removable scale member matable to each code bar unit, and means facilitating the insertion of an interchangeable code bar unit and its companion scale member.

17. In a keyboard perforator, perforating means for making perforations in a tape to represent successive lines made up of characters of different widths, means for totalizing the thicknesses of the characters in a line, means for deleting said characters, subduction means adapted to affect said totalizing means to correspond to said deletion, and means adapted to render said perforating means inoperative to perforate in code during the operation of the subduction means.

18. In a keyboard perforator, a perforating device, a counting device comprising means to totalize variable additive amounts and to indicate continuously such totalization, disabling means for said counting device, a series of keylevers, certain of said keylevers operable to effectuate the operation of said devices simultaneously, and certain other keylevers operable to effectuate simultaneously said perforating device and said disabling means.

19. In a keyboard device, a pair of members movable under different operating conditions, a plurality of keys corresponding to a series of characters, means operated upon the depression of each of said keys for effecting the movement of one of said members an amount predetermined by the particular key depressed, a justification key, means actuated by said justification key for controlling the movement of the other of said members relatively to the member controlled by the character keys, and signal means operated by the joint co-operation of said members.

20. In a keyboard device, a pair of members movable under different operating conditions, a plurality of keys corresponding to a series of characters, means operated upon the depression of each of said keys for effecting the movement of one of said members an amount predetermined by the particular key depressed, a justification key, means actuated by said justification key for controlling the movement of the other of said members relatively to the member controlled by the character keys, and means capable of operation to effect the movement of the first of said members subtractively in variable amounts according to the key operated in a direction reverse to the direction of its original movement.

21. In a keyboard perforator, a plurality of selector mechanisms arranged in the same plane, a series of keylevers, and a code bar unit detachably and removably interposable between said selector mechanisms and said keylevers, said unit comprising a plurality of code members, one individual to each keylever, each of said code members adapted to be actuated by its corresponding keylever to operate selectively and simultaneously said selector mechanisms in accordance with the key depressed.

22. In a keyboard device, a plurality of keys, a counting device comprising a single unit wheel which constantly tends to rotate, a series of stop bars, a selector mechanism comprising a detachable and removable code bar unit, said unit comprising a plurality of code members, one individual to each keylever, said mechanism operatively associated with said keys and adapted to selectively control said stop bars according to the key operated, a first pawl member, and a second pawl member, said pawl members adapted to co-act with said stop bars to control the escapement of said unit wheel in varying amounts and to actuate said counting device in a corresponding manner.

23. In a keyboard device, a plurality of keys, a counting device comprising means to totalize variable additive amounts and to indicate continuously such totalization including a single unit wheel constantly tending to rotate, a plurality of selectable stop bars, a selector mechanism operatively associated with said keys and adapted to selectively control said stop bars according to the key operated, a pair of pawl members arranged in cooperative relation with said unit wheel, one of said pawl members adapted to be fixedly related to said unit wheel, the other of said pawl members adapted to be movable with said unit wheel, said pawl members adapted to co-act with said stop bars to control the escapement of said unit wheel in varying amounts and to actuate said counting device in a corresponding manner.

24. In a keyboard device, a plurality of keys, a counting device comprising means to totalize variable additive amounts and to indicate continuously such totalization including a single unit wheel constantly tending to rotate, a series of stop bars, locking means for said stop bars, a selector mechanism operatively associated with said keys and adapted to selectively operate said stop bars according to the key operated, a pair of pawl members adapted to co-act with said stop members to control the escapement of said unit wheel variably and to actuate said counting device correspondingly, and said locking means operative to restrain said stop bars against movement during the operation of said unit wheel.

25. In a keyboard perforator, means for making perforations in a tape to represent successive lines made up of characters of different widths, a first shaft, a scale member carried on said shaft, an index member adapted to cooperate with said scale member to totalize said widths of characters, a second shaft, a unit wheel mounted on said second shaft, said shafts adapted to be subjected to a constant torque, means adapted to control the escapement of said first shaft and said scale uniformly, a pair of pawl members, and means adapted to control said pawl members to effect the escapement of said unit wheel in varying amounts to effect in turn a corresponding actuation to said index member, the combined actuation of said scale member and said index member indicating at all times the justifiability of the line being composed.

26. In a keyboard perforator, a perforating device, a counting device comprising means to totalize variable additive amounts and to indicate continuously such totalization, selector mechanisms individual to said devices, said selector mechanisms comprising a series of vertically movable selector bars, a series of keylevers, a corresponding series of code elements intermediate said selector bars and said keylevers, each of said code elements adapted to be actuated by its corresponding keylever to operate selected ones of said selector bars, and transitional means associated with each selector bar whereby the motion of the selected bars is made effective to condition said device for operation.

27. In a keyboard apparatus, a scale member, an index member, a series of keys corresponding to a series of characters, a first special key, a second special key, a dual escapement means, means controlled by a character key to move the index member, means controlled by the first special key through said escapement means to move the scale member a certain amount, and means controlled by the second special key through said escapement means to move the scale member a different amount, said second special key being also effective simultaneously to initiate the movement of said index member in the same direction to its initial position.

28. In combination with an apparatus for producing perforated strips to control composing machines utilizing different fonts of type, a perforating device, a counting device comprising means to totalize variable additive amounts and to indicate continuously such totalizations, selector mechanisms individual to each of said devices, and a set of code bars constituting a detachable and removable code bar unit corresponding to each font of type, said code bar units provided with laterally disposed tongues adapted to co-operate with corresponding grooves in the apparatus to render said code bar units readily insertable interchangeably in the apparatus to selectively control the operation of said selector mechanisms simultaneously according to the predetermined font of type to be used.

29. In a keyboard apparatus, a series of keys, a counting mechanism comprising means to totalize variable additive amounts and to indicate continuously such totalization, a unit carrying a series of code bars, means to control the operation of the counting mechanism according to the setting of said bars, said code bar unit being adapted to be interchangeably insertable in the apparatus for interchange according to the font of type to be used, the operative connection between the keys and the code bars being such that the code bars may be operated in a plurality of ways for each key, and means to select the way in which the code bar is to be operated.

30. In a keyboard apparatus suitable for preparing perforated forms adapted to control typographical composing machines, a plurality of keys, a counting device comprising means to totalize variable additive amounts and to indicate continuously such totalizations, a unitary permutation device intermediate the counting device and the keys of the keyboard, a different permutation unit being provided for each different font of type, means operable by said keys through said permutation device to variably control said counting device, and means to render said unit readily interchangeable according to the font of type to be used.

31. In a keyboard device, a plurality of keys, a counting device comprising means to totalize variable additive amounts and to indicate continuously such totalizations, said means including a single unit wheel, means to rotate said unit wheel variable amounts in a certain direction according to the keys depressed, an indicator operable variably to correspond to the operation of the unit wheel, and means to rotate the indicator and the unit wheel simultaneously to a predetermined starting position in the same direction as during the variable operation.

32. In a keyboard device, a plurality of keys, a constantly rotating shaft, a perforating device, a counting device comprising means to totalize variable additive amounts and to indicate continuously such totalizations, a cam to perform the perforating operation, a cam to initiate the counting operation, a shaft upon which both said cams are mounted, a clutch adapted to couple the constantly rotating shaft to the cam shaft, means to couple the clutch controlled by the keys, and means also controlled by the keys to variably operate both devices.

33. In a keyboard device, a plurality of keys, a constantly rotating shaft, a perforating device, an electromagnet to operate the perforating device, a normally stationary shaft, a counting device comprising means to totalize variable additive amounts and to indicate such totalizations, means carried by said shaft to initiate the operation of the counting device, a contact, a cam also carried by said shaft and adapted to close the contact to energize the magnet, a clutch to couple the constantly rotating shaft to the stationary shaft, and means controlled by the depression of any of said keys to cause the clutch to engage.

34. In a keyboard, a plurality of keys, a counting device comprising means to totalize variable amounts and to indicate such totalizations, a perforating device adapted to perforate holes in a single operation in a fixed maximum number of permissible positions in record receiving material, means to vary the holes perforated according to the key depressed, means to variably operate the counter according to the key depressed, and a key adapted to cause all keys to initiate the perforation of holes in all permissible positions and to reverse the action of the counter for each key.

35. In a keyboard perforator, means to make perforations in record receiving material representing successive lines of printed matter composed of characters of different widths, a plurality of keys, an indicator, means to move the indicator for each key depressed an amount corresponding to the width of the corresponding character, a deleting key, and means effective when the deleting key is depressed to render each key effective to perforate a rubout signal and to reverse the action of the indicator for keys dedepressed with the deleting key by an amount equal to the forward action in the normal state.

36. In a keyboard device, a series of keys, a universal bar, a code bar corresponding to each key, an interference member associated with each key, means operated by each key to move the corresponding interference member between the universal bar and the corresponding code bar, means to cause the universal bar to operate said corresponding code bar, and means to return the operated interference member before the return of the key.

37. In a keyboard device, a series of keys, a special key, an indicator shaft, means controlled by each of said series of keys to rotate said shaft at a normal rate of speed, and accelerant means controlled by said special key adapted to supervene said first means to rotate said shaft at a higher rate of speed.

38. In a keyboard device, a plurality of keys, a constantly rotating shaft, a counting device comprising means to totalize variable additive amounts and to indicate continuously such totalizations, said means including an intermittently movable element, clutch mechanism between said shaft and said element, and means operated by the keys to control said clutch mechanism variably and thereby permit said element to move a varying amount depending upon the key depressed.

39. In a device, a counting device comprising means to totalize variable additive amounts and to indicate continuously such totalizations, said means including a single unit wheel constantly tending to rotate, a pawl, a stop arm, means to render said pawl and said arm alternately engageable with said unit wheel, a series of stop bars adapted to cooperate with said pawl and said arm to control the escapement of said unit wheel in varying amounts and to actuate said counting device in a corresponding manner, and means to establish the centricity of said unit wheel and said stop arm to effect said escapement.

40. In a keyboard device, a plurality of keys, a constantly rotating shaft, a perforating mechanism comprising an intermittently rotatable element, a counting mechanism comprising means to totalize variable additive amounts and to indicate continuously such totalizations, said means including an intermittently movable element, means controlled by the keys to connect both of said elements to said shaft, and means to variably operate both of said mechanisms according to the key depressed.

41. In a keyboard device, a plurality of keys, a constantly rotating shaft, a perforating device, a counting device comprising means to totalize variable additive amounts and to indicate continuously such totalizations, a dual functionary element to control the operation of said devices, a shaft upon which said element is mounted, a clutch adapted to couple the constantly rotating shaft to said last mentioned shaft, means to couple the clutch controlled by the keys, and means also controlled by the keys to variably operate both devices.

42. In a keyboard device, a plurality of keys, a first bail operable by each of the keys, a second bail operable in cycles, means controlled by said first bail to initiate the operation of said second bail, and means independent of the length of time a key is actuated to limit the operation of said second bail to a single cycle.

43. In a device, a constantly rotating shaft, a pair of members movable under different operating conditions, a dual functionary element carried on said shaft and adapted to operate said members simultaneously, a friction clutch adapted to be operatively associated continuously with said element during its complete cycle of operation, a grab clutch adapted to be operatively associated periodically with said element, and means adapted to render said grab clutch effective only during an intermediate period of the cycle of operation of said element.

44. In a keyboard device, a plurality of keys, a constantly rotating shaft, a perforating device, an intermittently rotatable member to operate the perforating device, a counting device comprising means to totalize variable additive amounts and to indicate continuously such totalizations, a second intermittently rotatable member to operate the counting device, a first clutch to couple the first intermittently rotatable member to the constantly rotating shaft, a second clutch to couple the second intermittently rotatable member to the constantly rotating shaft, means controlled by the keys to couple the first clutch, means controlled by the first intermittently rotatable member to couple the second clutch, and means to operate both the perforating and counting devices variably according to the key depressed.

45. In a keyboard device, a series of keys, a counting device comprising means to totalize variable amounts and to indicate continuously such totalizations, means to operate said mounting device, means to determine the movement of the counting device according to the key depressed, and means to lock said determining means according to the key depressed until the corresponding counting operation has been completed.

46. In combination with a device for producing perforated strips to control composing machines, a plurality of elements, a selecting mechanism operable in accordance with the operation of said elements comprising a series of selectable members and a detachable and interchangeable code bar unit provided with a plurality of coded elements corresponding to said first recited elements and selectively and operably related thereto, and means facilitating the insertion of interchangeable units between said first recited elements and said selectable members.

47. In combination with a keyboard device for producing perforated strips to control composing machines, a plurality of key levers, a selecting mechanism operable in accordance with the operation of said key levers comprising a series of selectable members and a detachable and interchangeable code bar unit provided with a plurality of coded elements corresponding to said first recited elements and selectively and operably related thereto, and means facilitating the insertion of interchangeable units between said first recited elements and said selectable members.

48. In combination with a keyboard device, a series of key levers, mechanisms adapted to be controlled by said key levers, a floating element associated with each key lever, an operating bail common to said elements, a single means adapted for each effectiveness thereof to limit the operation of said bail to a single cycle, means operative by said key levers to actuate their respective elements to initiate through the instrumentality of said bail the operation of said mechanisms, a special key, and means associated with said special key to render said single means ineffective thereby to effect automatically the continuous operation of said mechanisms in accordance with the key lever operated.

49. In a keyboard device, a series of key levers, an operating bail common to said key levers, a single means adapted for each effectiveness thereof to limit the operation of said bail to a single cycle, means operative by said key levers to initiate the operation of said bail, a special key lever, and means associated with said special key lever to render said single means ineffective thereby to effect automatically the continuous operation of said bail.

50. In a keyboard device, a plurality of keys, a constantly rotating shaft, a counting device comprising means to totalize variable additive amounts and to indicate such totalization and including a single unit wheel, means to actuate said unit wheel variable according to the keys operated to control said counting device correspondingly, and frictional connection between said shaft and said unit wheel through which power is communicated to said unit wheel.

51. In a keyboard device for producing perforated strips, a plurality of means to perform different operations, a key corresponding to each means, a power operated universal bar common to all said means, means associated with each key adapted to perform control operations to render said universal bar effective to actuate said plurality of means, and means common to all the keys to initiate the operation of the universal bar.

52. In a device, a first means operating under certain operating conditions, a second means operating under other operating conditions, and signal means comprising two articulated parts operable in transverse planes cooperatively related to said first and second means to apprise the operator of the establishment of a predetermined condition.

53. In an apparatus, a signal device, a first means operating under certain operating conditions, a second means operating under other operating conditions, cam means individual to each of said means, and means comprising a first element coacting with both of said cam means and a second element actuated in accordance with the resultant movement of said first element to control said signal device.

54. In an apparatus, a signalling device, a first means operable under certain operating conditions, a second means operable under other operating conditions, a dually operated device operated in accordance with both said means for jointly controlling said signalling device to apprise the operator of the arrival of a predetermined condition.

55. In an apparatus, a signalling device, a first mechanism, a second mechanism, a device dually operated in accordance with two independent conditions established through the instrumentality of said mechanisms for jointly controlling said signalling device to apprise the operator of the arrival of a predetermined condition.

56. In an apparatus for producing perforated strips to control composing machines utilizing different fonts of type, a perforating device, a counting device, selector mechanisms individual to each of said devices, and a unit set of code bars corresponding to different fonts of type, said code bar units adapted to be interchangeably insertable in the apparatus to selectively control the operation of said selector mechanisms simultaneously according to the predetermined font of type to be used.

57. In an apparatus for producing perforated strips to control composing machines utilizing different fonts of type, a perforating device, a counting device, and a selecting mechanism for controlling said devices comprising a unit set of code bars corresponding to one of several fonts of type, said code bar units adapted to be interchangeably insertable in the apparatus to selectively control the operation of said selecting mechanism according to the predetermined font of type to be used.

58. In a tape perforator, punching mechanism, tape receiving mechanism including a ratchet, a bell crank lever and a spring actuated pawl carried by said lever, said bell crank lever normally operated by said punching mechanism to operate through the instrumentality of said pawl and said ratchet said tape receiving means, and means carried by said pawl operable directly by the tape to diminish the effect of said bell crank lever.

59. In a tape perforator, punching mechanism, tape receiving means including a ratchet, a bell crank lever, and a spring actuated pawl carried by said lever, said bell crank lever normally operative by said punching mechanism to impart through the instrumentality of said pawl and said ratchet rotative motion to said receiving means, and means carried by said pawl operable directly by the tape and controlled by the tautness thereof to check said motion.

60. In a keyboard device, a plurality of keys, a counting device comprising an index number and a unit wheel making a plurality of revolutions for one cycle of revolution of said index member, means to return the index member and unit wheel to their beginning-of-line or zero-stop position, means associated with the index member to determine the number of revolutions to be made by the unit wheel when returning to its beginning-of-line position, and means associated with the unit wheel to accurately determine its stopping position.

61. In a keyboard device, a plurality of keys, a counting device including an index member and a unit wheel, said unit wheel making a plurality of revolutions for one revolution of said index member, means to initiate the return of said index member and said unit wheel to their beginning-of-line or zero-stop position, means associated with said index member to determine the number of revolutions made by the unit wheel when returning to the beginning of line position, and means associated with the unit wheel to accurately determine its stopping position.

62. In a keyboard device, a combination comprising a rotatable member, a plurality of key levers, means controlled at each operation of said key levers for causing a corresponding complete cycle of operation of said member, the rotation of said member being independent of the positions of said key levers after their operation, and means to enable the depression of another key before the rotatable member has completed the cycle initiated by the prior key depressed.

63. In a keyboard device, signal determining means, a rotatable member, a series of key levers, means controlled at each operation of said key levers for causing a corresponding complete cycle of operation of said member and thereby variably operate the signal determining means according to the key initiating the operation, and means to enable the depression of a second key during the cycle of operation initiated by the prior key depressed for determining the character of a second operation, the character of the first mentioned operation being unaffected by the depression of the second key.

64. In a keyboard device, the combination comprising a rotary member, a plurality of key levers, means controlled by each operation of said key levers for causing a corresponding cycle of operation of said member, and means to enable the depression of a second key before the rotary member has completed its first cycle.

65. In a keyboard device, a rotary member, a series of key levers, means controlled at each operation of a key lever to initiate a cycle of operation of said rotary member, signal controlling means variably operated by said rotary member corresponding to the key initiating the operation, and means to enable the depression of another key to determine a second cycle of operation according to the second key depressed before the rotary member has completed the first cycle, and before the signal controlling means has completed the operation corresponding to the first key depressed.

66. In a keyboard device, the combination of a permutation device, a series of key levers, means to set said permutation device in varying permutations according to the key depressed, a signal controlling device, means to operate the signal controlling device variably according to the setting of the permutation device, and means to enable the depression of a second key to determine a second setting of said permutation device before the operation of the signal controlling device corresponding to the first key depressed is completed.

67. In a keyboard device, signal controlling means, a series of key levers, means to initiate the operation of the signal controlling means following the depression of each key, and means associated with each key to prevent more than one operation of the signal controlling means for a single operation of a key independent of the length of time a key is depressed.

68. In a keyboard device, a series of key lever devices, each device composed of a plurality of associated elements, means to operate one of said elements and thereby operate other of said elements to initiate the corresponding operation, and means to return the said other elements to normal independent of the position of the first operated element.

69. In a keyboard device, a series of selecting bars, a series of keys, means to set the selecting bars according to the keys depressed, means to lock the operated selecting bars, and means to enable the depression of another key for determining another setting of selecting bars before the previous setting has been released.

70. In a keyboard perforator, a perforating device, a plurality of keys adapted to operate the perforating device variably, a starting mechanism for the perforating device, connection between each key and the starting mechanism, separate release mechanism associated with each key, and means to operate the release mechanism associated with an operated key so that the starting mechanism can be controlled by another key before the previous key has returned to normal.

71. In a keyboard device, a series of code bars, a series of keys, a universal bar adapted to operate any selected code bar, means to initiate the operation of said universal bar from any key, means to render the universal bar effective to operate the code bar corresponding to the key depressed, and means to restore power in the universal bar prior to the depression of each key.

72. In a keyboard device, a series of keys, a series of code bars, a universal bar adapted to operate any code bar, power to operate the universal bar being derived from a source independent of the power applied to the keys, means to initiate the operation of said universal bar from any key, and means to render the universal bar effective to operate the code bar selected in accordance with the key depressed.

73. In combination with a device for producing perforated strips to control composing machines, a plurality of elements, a selecting mechanism operable in accordance with the operation of said elements comprising a detachable and interchangeable code bar unit provided with a plurality of floating coded elements corresponding to said first recited elements and selectively and operably related thereto, and means facilitating the insertion of interchangeable units.

74. In a keyboard apparatus, a first device, a second device, disabling means for said second device, a series of key levers, certain of said key levers operable to effectuate the operation of said devices simultaneously, and certain other key levers operable to effectuate simultaneously said first device and said disabling means.

75. In an apparatus for producing perforated strips to control composing machines utilizing different fonts of type, a perforating device, a counting device, selector mechanisms individual to each of said devices and arranged in the same plane, and a unit set of code bars corresponding to each font of type, said code bar units adapted to be interchangeably insertable in the apparatus to selectively control the operation of said selector mechanisms simultaneously according to the predetermined font of type to be used.

76. In combination with a device for producing perforated strips to control composing machines, a plurality of elements, a selecting mechanism operable in accordance with the operation of said elements comprising a detachable and interchangeable code bar unit provided with a plurality of coded elements selectively and operatively related thereto and means to move said coded elements collectively to either of two positions, and means facilitating the insertion of interchangeable units.

77. In combination with a device for producing perforated strips to control composing machines, a plurality of elements, a selecting mechanism operable in accordance with the operation of said elements comprising a series of selectable members, a detachable and interchangeable code bar unit provided with a plurality of coded elements corresponding to said first recited elements and selectively and operatively related thereto and means to shift said coded elements collectively to vary the effect thereof on said selectable members, and means facilitating the insertion of interchangeable units.

78. In a keyboard tape perforating device, means to move the tape in a direction substantially parallel to the major axis of the keyboard, and means for perforating the tape effective to hold the tape in an acclivous plane disposed at an angle measured in a plane transverse to the directional movement of the tape so that it can be read by the operator.

79. In a keyboard device, a counter, a plurality of keys including character keys and an end-of-line key, a constantly rotating shaft, means to connect the counter to the rotating shaft in response to the depression of a character key to operate the counter, and means responsive to the depression of the end-of-line key to connect the counter to the rotating shaft to run at a higher speed when running the counter to a starting position.

80. In a keyboard device, a series of key levers, a member associated with each key lever and carrying a series of code projections, a series of permutation elements, and power operated means to set the permutation elements in combinations corresponding to the combination of projections on the member corresponding to a depressed key.

81. In a keyboard device, a series of key levers, a series of permutation bars, power operated means to set the bars according to the key depressed, signal determining means, and means to operate the signal determining means according to the bars set.

82. In a keyboard device, a rotary member, a series of key levers, means controlled at each operation of a key lever to initiate a cycle of operation of said rotary member, signal controlling means variably operated by said rotary member corresponding to the key initiating the operation, and means to start a second cycle of operation according to the second key depressed before the rotary member has completed the first cycle and before the signal controlling means has completed the operation corresponding to the first key depressed.

83. In a keyboard device, the combination of a permutation device, a series of key levers, means to set said permutation device in varying permutations according to the key depressed, a signal controlling device, means to operate the signal controlling device variably according to the setting of the permutation device, and means to make a second setting of said permutation device before the operation of the signal controlling device corresponding to the first key depressed is completed.

84. In a keyboard device, a series of selector bars, a series of keys, means to set the selector bars according to the keys depressed, means to lock the operated selector bars, and means to determine another setting of selector bars before the previous setting has been released.

85. In combination with a keyboard device for producing perforated strips to control line composing machines, a plurality of elements, a selecting mechanism operable in accordance with the operation of said elements comprising a series of selectable members and a removable and interchangeable code bar unit provided with a plurality of code elements corresponding to said first recited elements and selectively and operably related thereto, and means to locate the removable unit in operative relation with said first recited elements and said selectable members.

86. In a keyboard device, a plurality of keys, a counting device comprising means to totalize variable additive amounts and to indicate continuously such totalization, said means including a single unit wheel, means to rotate said unit wheel variable amounts in a certain direction according to the keys depressed, a uni-directional indicator operable variably to correspond to the operation of the unit wheel, and means to rotate the indicator and the unit wheel simultaneously to a predetermined starting position.

87. In a keyboard tape perforating device, means to move the tape in a direction substantially parallel to the major axis of the keyboard, and a perforating means comprising a plurality of perforating elements adapted to perforate said tape, said perforating means arranged to cooperate with said first recited means and to hold the tape in an acclivous plane disposed at an angle measured in a plane transverse to the directional movement of the tape so that it can be read by an operator.

88. In a keyboard device for producing perforated strips to control composing machines, a plurality of key levers corresponding to matrices, means for totalizing the thicknesses of the matrices identified with the key levers operated, means for conditioning said means for reverse operation, and subduction means associated with said totalizing means effective subsequent to said conditioning operation to operate said totalizing means reversely in correspondence with the key levers operated.

89. In a keyboard apparatus, a plurality of key levers corresponding to matrices, means for totalizing the thicknesses of the matrices identified with the key levers operated, means for conditioning said means for reverse operation, and subduction means separate from and associated with said totalizing means effective subsequently to said conditioning operation to operate said totalizing means reversely in correspondence with the key levers operated.

90. In a keyboard apparatus, means for producing indicia in a control strip to represent successive lines made up of characters of different widths, means for totalizing the thicknesses of the characters in a line, means for deleting said characters, and subduction means to affect the totalizing means to correspond to said deletion.

91. In a keyboard device, means for producing indicia in a control strip to represent successive lines made up of characters of different widths, means for totalizing the thicknesses of the characters in a line, means for deleting said characters, subduction means adapted to effect said totalizing means to correspond to said deletion, and means to render said first recited means inoperative to produce indicia in code during the operation of the subduction means.

92. In a keyboard device, a plurality of keys, a counting device comprising means to totalize variable additive amounts and to indicate such totalization, an indicia producing device adapted to produce indicia in a single operation in a fixed maximum number of permissible positions in record receiving material, means to vary the indicia produced according to the key depressed, means to variably operate the counter according to the key depressed, and a key to cause all keys to initiate the production of indicia in all permissible positions and to reverse the action of the counter for each key.

93. In a keyboard apparatus, means to produce control indicia in record receiving material representing successive lines of printed matter composed of characters of different widths, a plurality of keys, an indicator, means to move the indicator for each key depressed an amount corresponding to the width of the corresponding character, a deleting key, and means effective when the deleting key is depressed to render each key effective to produce a rub-out signal and to reverse the action of the indicator for keys depressed with the deleting key by an amount equal to the forward action in the normal state.

94. In a keyboard apparatus, means for producing indicia on a control strip, an indicator, a counting mechanism operable under certain conditions for operating said indicator in accordance with the indicia produced on the strip, means for deleting said indicia, and means cooperable with said counting mechanism for reversing the effect of said counting mechanism upon said indicator to correspond to said deletion.

95. In a keyboard apparatus, a plurality of key levers corresponding to matrices, totalizing means, means for operating said totalizing means an amount corresponding to a matrix thickness during a single stroke of the key lever operated, means for conditioning said totalizing means for reverse operation, and subduction means associated with said totalizing means effective subsequently to said conditioning operation to operate said totalizing means reversely an amount equivalent to said amount during another single stroke of said operated key lever.

96. In a keyboard apparatus, a plurality of key levers corresponding to matrices, totalizing means, means for operating said totalizing means an amount corresponding to a matrix thickness during a single stroke of the key lever operated, means for conditioning said totalizing means for reverse operation, and subduction means separate from and associated with said totalizing means effective subsequently to said conditioning operation to operate said totalizing means reversely an amount equivalent to said amount during another single stroke of said operated key lever.

97. Means for preparing a control record for actuation of linecasting machines and the like comprising a plurality of members and means for selectively actuating said members for preparing the control records, means for measuring the space the characters appearing on the control record will occupy in regular line printing, means for indicating said measurement, means for blotting out characters appearing on the control record and means for subtracting the measurements of the blotted out characters from the indicator.

98. A machine for preparing a control sheet for character reproducing machines comprising means for placing a line of control characters on said sheet, means for measuring the space the characters in a line will occupy in regular line printing, means for blotting out one or more characters in a line, and means for subtracting the measurement of the blotted out character or characters from said measuring means.

99. Means for producing a line of characters, means for measuring the space the characters in a line will occupy in regular line printing, means for cancelling a character, and means for subtracting the measurement of a cancelled character from said measuring means.

100. Means for producing a line of characters, means for measuring the space the characters in a line will occupy in regular line printing, means for cancelling a character, and means operable by a cancelling operation for subtracting the measurement of a cancelled character from said measuring means.

101. Means for preparing a control record for actuation of linecasting machines and the like comprising a plurality of members and means for selectively actuating said members for preparing the control record, means for measuring the space the characters appearing on the control record will occupy in regular line printing, means for indicating said measurement, means for cancelling characters appearing on the control record and means for subtracting the measurements of the cancelled characters from the indicator.

102. Means for preparing a control record for actuation of linecasting machines and the like comprising a plurality of members and means for selectively actuating said members for preparing the control record, means for measuring the space the characters appearing on the control record will occupy in regular line printing, means for indicating said measurement, means for obliterating characters appearing on the control record, and means for subtracting the measurements of the obliterated characters from the indicator.

103. A machine for preparing a control sheet for character reproducing machines comprising means for placing a line of control characters on said sheet, means for measuring the space the characters in a line will occupy in regular line printing, means for obliterating one or more characters in a line, and means for subtracting the measurement of the obliterated character or characters from said measuring means.

104. In a machine of the class described, in combination, a periodically operable shaft, a clutch through which power is communicated for driving said shaft in either of two directions, a driven shaft, drive mechanism interposed between said shafts for variably rotating the latter shaft in each periodic operation of the first shaft, and means for controlling the action of said clutch for determining the direction of rotation of the driven shaft.

105. In combination, an element movable in variable amounts, a plurality of keys, means for imparting variable movement to said element in response to the operation of said keys individually, and means for determining the direction of movement of said element in variable amounts corresponding to each key operated.

106. In an accumulator for key operated machines, a cumulatively actuatable instrumentality having a normal direction of movement, a plurality of key levers, means for actuating said instrumentality in said normal direction in variable incremental amounts for each actuation of a key lever, and means for controlling the movement of said instrumentality in a reverse direction in corresponding decremental amounts.

107. In a machine of the class described, a movable element, a plurality of key levers, means for imparting movement to said element in steps of varying length for each actuation of a key lever, and means for determining the directional movement of said element in accordance with said steps.

108. In combination, an element movable normally in variable additive amounts, a plurality of keys, means for imparting variable movements to said element in response to the operation of said keys individually, and means for altering the direction of movement of said element in decremental amounts corresponding to each key operated.

109. In an accumulator for key operated machines, an actuatable instrumentality having a normal direction of movement, a plurality of key levers, means for actuating said instrumentality in said normal direction in variable amounts for each actuation of a key lever, and means for controlling the movement of said instrumentality in a reverse direction in corresponding amounts.

LOUIS M. POTTS.